March 17, 1959 F. P. GOHOREL 2,878,328

FAULT RECORDER FOR AUTOMATIC TELEPHONE EXCHANGE

Filed July 3, 1956 13 Sheets-Sheet 1

Inventor
F. P. GOHOREL
By Robert Harding Jr.
Attorney

March 17, 1959 F. P. GOHOREL 2,878,328

FAULT RECORDER FOR AUTOMATIC TELEPHONE EXCHANGE

Filed July 3, 1956 13 Sheets-Sheet 2

Inventor
F. P. GOHOREL
By Robert Harding Jr.
Attorney

Inventor
F. P. GOHOREL
By Robert Harding Jr.
Attorney

Inventor
F. P. GOHOREL
By Robert Harding Jr.
Attorney

March 17, 1959 F. P. GOHOREL 2,878,328

FAULT RECORDER FOR AUTOMATIC TELEPHONE EXCHANGE

Filed July 3, 1956 13 Sheets-Sheet 5

*Inventor*

F. P. GOHOREL

By Robert Harding Jr.

*Attorney*

*Inventor*
F. P. GOHOREL
By Robert Harding Jr.
*Attorney*

FAULT RECORDER FOR AUTOMATIC TELEPHONE EXCHANGE

*Inventor*
F. P. GOHOREL
*By* Robert Harding Jr.
*Attorney*

March 17, 1959 F. P. GOHOREL 2,878,328

FAULT RECORDER FOR AUTOMATIC TELEPHONE EXCHANGE

Filed July 3, 1956 13 Sheets-Sheet 8

Inventor

F. P. GOHOREL

By [signature]

Attorney

March 17, 1959 F. P. GOHOREL 2,878,328

FAULT RECORDER FOR AUTOMATIC TELEPHONE EXCHANGE

Filed July 3, 1956 13 Sheets-Sheet 9

FIG. 9.

| | | | | | | | |
|---|---|---|---|---|---|---|---|
| MKm1 | Cb1 | MKm27 | Ci6 | MKm53 | Cl6 | MKm79 | Yj1 |
| MKm2 | Cb2 | MKm28 | Ci7 | MKm54 | | MKm80 | Yi0 |
| MKm3 | Cb3 | MKm29 | Ch6 | MKm55 | Ya1 | MKm81 | Yh2 |
| MKm4 | Cb4 | MKm30 | Ch7 | MKm56 | Yb1 | MKm82 | Yk1 |
| MKm5 | Cb5 | MKm31 | Ce1 | MKm57 | Ya0 | MKm83 | Yj0 |
| MKm6 | Ca1 | MKm32 | Ce2 | MKm58 | Yc1 | MKm84 | Yi2 |
| MKm7 | Ca2 | MKm33 | Ce3 | MKm59 | Yb0 | MKm85 | Yl1 |
| MKm8 | Ca3 | MKm34 | Ce4 | MKm60 | Ya2 | MKm86 | Yk0 |
| MKm9 | Ca4 | MKm35 | Ce5 | MKm61 | Yd1 | MKm87 | Yj2 |
| MKm10 | Ca5 | MKm36 | Cf1 | MKm62 | Yc0 | MKm88 | Ym1 |
| MKm11 | Cd1 | MKm37 | Cf2 | MKm63 | Yb2 | MKm89 | Yl0 |
| MKm12 | Cd2 | MKm38 | Cf3 | MKm64 | Ye1 | MKm90 | Yk2 |
| MKm13 | Cd3 | MKm39 | Cf4 | MKm65 | Yd0 | MKm91 | Yn1 |
| MKm14 | Cd4 | MKm40 | Cf5 | MKm66 | Yc2 | MKm92 | Ym0 |
| MKm15 | Cd5 | MKm41 | Cg1 | MKm67 | Yf1 | MKm93 | Yn0 |
| MKm16 | Cc1 | MKm42 | Cg2 | MKm68 | Ye0 | MKm94 | Yo0 |
| MKm17 | Cc2 | MKm43 | Cg3 | MKm69 | Yd2 | MKm95 | Yp0 |
| MKm18 | Cc3 | MKm44 | Cg4 | MKm70 | Yg1 | MKm96 | Yq0 |
| MKm19 | Cc4 | MKm45 | Cg5 | MKm71 | Yf0 | MKm97 | Yr0 |
| MKm20 | Cc5 | MKm46 | Cl1 | MKm72 | Ye2 | MKm98 | Ys0 |
| MKm21 | Ck1 | MKm47 | Cl2 | MKm73 | Yh1 | MKm99 | Yt0 |
| MKm22 | Ck2 | MKm48 | Cl3 | MKm74 | Yg0 | MKm100 | Yu0 |
| MKm23 | Ck3 | MKm49 | Cl4 | MKm75 | Yf2 | MKm101 | t |
| MKm24 | Ck4 | MKm50 | Cl5 | MKm76 | Yi1 | MKm102 | |
| MKm25 | Ck5 | MKm51 | Ce6 | MKm77 | Yh0 | MKm103 | t' |
| MKm26 | Cj7 | MKm52 | | MKm78 | Yg2 | MKm104 | Cj6 |

Inventor
F. P. GOHOREL
By Robert Harding Jr.
Attorney

FIG. 10.

| | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| PAa1...PBt1 | PCd | | h1 | h6 | h11 | h18 | h23 | h28 | MKm 1 | MKm 6 | MKm 11 | MKm 16 | MKm 21 | MKm 31 | MKm 36 | MKm 41 | MKm 46 | MKm 101 | | | |
| PAa2...PBt2 | PCe | MKc 105 | h2 | h7 | h12 | h19 | h24 | h29 | MKm 2 | MKm 7 | MKm 12 | MKm 17 | MKm 22 | MKm 32 | MKm 37 | MKm 42 | MKm 47 | MKm 102 | | | |
| PAa3...PBt3 | PCf | | h3 | h8 | h13 | h20 | h25 | h30 | MKm 3 | MKm 8 | MKm 13 | MKm 18 | MKm 23 | MKm 33 | MKm 38 | MKm 43 | MKm 48 | MKm 103 | | | |
| PAa4...PBt4 | PCg | MKc 106 | h4 | h9 | h14 | h21 | h26 | h31 | MKm 4 | MKm 9 | MKm 14 | MKm 19 | MKm 24 | MKm 34 | MKm 39 | MKm 44 | MKm 49 | | | | |
| PAa5...PBt5 | PCh | | h5 | h10 | h15 | h22 | h27 | h32 | MKm 5 | MKm 10 | MKm 15 | MKm 20 | MKm 25 | MKm 35 | MKm 40 | MKm 45 | MKm 50 | | | | |
| PAa6...PBt6 | PCi | | | | h16 | | | | | | MKm 104 | MKm 27 | MKm 29 | MKm 51 | MKm 52 | | MKm 53 | | MKm 55 | MKm 56 | MKm 58 |
| PAa7...PBt7 | PCj | | | | h17 | | | | | | MKm 26 | MKm 28 | MKm 30 | | | | | | MKm 54 | MKm 57 | MKm 59 |
| PAa8...PBt8 | | | | | | | | | | | | | | | | | | | | | |
| PAa9...PBt9 | | | | | | | | | ⏚ | ⏚ | ⏚ | ⏚ | ⏚ | ⏚ | ⏚ | ⏚ | ⏚ | ⏚ | ⏚ | ⏚ | ⏚ |

| | | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|
| PAa1...PBt1 | PCd | | | | | | | | | | | | | | | | | | | | |
| PAa2...PBt2 | PCe | MKm 60 | MKm 63 | MKm 66 | MKm 69 | MKm 72 | MKm 75 | MKm 78 | MKm 81 | MKm 84 | MKm 87 | MKm 90 | | | | | | | | | |
| PAa3...PBt3 | PCf | | | | | | | | | | | | | | | | | | | | |
| PAa4...PBt4 | PCg | | | | | | | | | | | | | | | | | | | | |
| PAa5...PBt5 | PCh | | | | | | | | | | | | | | | | | | | | |
| PAa6...PBt6 | PCi | MKm 61 | MKm 64 | MKm 67 | MKm 70 | MKm 73 | MKm 76 | MKm 79 | MKm 82 | MKm 85 | MKm 88 | MKm 91 | | | | | | | | | |
| PAa7...PBt7 | PCj | MKm 62 | MKm 65 | MKm 68 | MKm 71 | MKm 74 | MKm 77 | MKm 80 | MKm 83 | MKm 86 | MKm 89 | MKm 92 | MKm 93 | MKm 94 | MKm 95 | MKm 96 | MKm 97 | MKm 98 | MKm 99 | MKm 100 | |
| PAa8...PBt8 | | | | | | | | | | | | | | | | | | | | | |
| PAa9...PBt9 | | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ | ⏚ |

Inventor
F. P. GOHOREL
By [signature]
Attorney

March 17, 1959 F. P. GOHOREL 2,878,328

FAULT RECORDER FOR AUTOMATIC TELEPHONE EXCHANGE

Filed July 3, 1956 13 Sheets-Sheet 11

Inventor
F. P. GOHOREL
By Robert Harding Jr.
Attorney

March 17, 1959 F. P. GOHOREL 2,878,328

FAULT RECORDER FOR AUTOMATIC TELEPHONE EXCHANGE

Filed July 3, 1956 13 Sheets-Sheet 12

*Inventor*

F. P. GOHOREL

*By* Robert Harding Jr.

*Attorney*

Inventor
F. P. GOHOREL
By [signature]
Attorney 2,878,328

FAULT RECORDER FOR AUTOMATIC TELEPHONE EXCHANGE

Fernand Pierre Gohorel, Antony, France, assignor to International Standard Electric Corporation, New York, N. Y., a corporation of Delaware Application July 3, 1956, Serial No. 595,766

Claims priority, application France July 5, 1955

8 Claims. (Cl. 179—175.2)

The present invention refers to improvements in automatic telephone systems and more particularly to devices for signaling and recording faults capable of affecting the operation of the various members used for the routing of a call.

In certain automatic telephone systems, the members bringing about and controlling the various selections involved in the routing of a call can be divided into two classes: (1) common members, coming into play during the operations involved in hunting for the calling or for the called line, and (2) individual members, capable of being connected temporarily to said common members in the course of said hunting operations. In some exchanges using crossbar switches, the registers send to the various selection stages the selective combinations required for the routing of the call. In each of them, a marker receives these combinations from the register with which it is temporarily associated and brings about the various operations involved in the selection. In such exchanges, the registers constitute the common members and the markers, the individual members.

The faults likely to affect the common members do not perforce concern all the calls routed through said members, because these faults can result from the temporary association of these common members with certain particular individual members whose identity it is of interest to learn. Thus, in the event of a fault, a common member should not be blocked for longer than necessary to record the condition of the main components of said member, as also the condition relative to individual members likely to be connected to the common member involved at the instant the fault occurs.

The invention proposes to prepare, for each fault, a record containing a certain amount of information on the condition of the members in service at the time a fault occurs, this method making it possible to store said records, to use them subsequently according to operating requirements and to determine accurately the causes of the various troubles. Such records can be obtained by means of perforators, by means of teleprinters or by any other information-recording method.

One of the features of the invention is a device for signaling and recording faults likely to affect the various members bringing about and controlling the various selections involved in the routing of a call, arrangements being provided to connect in succession to an auxiliary memory (1) the seized common member and (2) the various individual members temporarily connected to said common member at the moment the fault occurs, the auxiliary memory thereupon sending to a fault recorder the information received and then releasing.

In the course of the routing of a call, the seized common member brings about and controls in succession a certain number of elementary operations during the hunting for the calling or the called line. It is important to make sure that each elementary operation be performed within a specified period of time.

Another feature of the invention lies in associating with each common member of the exchange a time device controling the time taken to perform each elementary operation brought about by said common member, said time device putting in calling position, on the banks of a member finder, the common member with which it is associated whenever said member takes more than its allotted time to perform said elementary operation, said member being thereupon connected to an auxiliary memory through the finder.

In order to facilitate the finding of a fault, either in a common or in an individual member, it is important to know the condition in which the various components of said members find themselves at the time of the fault.

Another feature of the invention lies in associating a fault wire with each of the main relays or magnets and in providing arrangements that will allow bringing said wire to a characteristic potential revealing, at the instant a fault occurs, the condition of the relay or magnet with which it is associated, it being possible to connect said fault wires, through the member finder, to an auxiliary memory that will then record their characteristic potentials.

It is important to know at the instant a fault occurs the identity of the calling common member and that of the individual members capable of being temporarily associated with it.

Another feature of the invention lies in using the position taken by the member finder to determine the identity of the calling member, an identity that can thereupon be sent to the auxiliary memory, which will record it temporarily.

If the seized common member is temporarily associated with individual members at the time a fault occurs, it is desirable to connect said individual members to the auxiliary memory in order to allow it to record (1) their respective identities and (2) the condition of their fault wires.

Another feature of the invention lies in that, when the connection between the faulty common member and the auxiliary memory has been made, and once said memory is in a position to record the condition of the fault wires of said common member, arrangements are provided to cause (1) the temporary release of the member finder and (2) the sending of a special signal to the seized common member, this signal being thereupon sent by said common member to the various individual members with which it is temporarily associated at the instant the fault occurs, arrangements being provided for then putting in calling position on the banks of the member finder the first of said individual members and for cancelling the temporary release of the member finder, the self-same cycle then recurring for each individual member temporarily associated with said common member, the auxiliary memory recording in succession the identity and the condition of the fault wires of said individual members.

When the recording of the identity and of the condition of the fault wires of the last individual member associated with the common member has ended, arrangements must be provided to release the member finder and to connect the auxiliary memory to a recording device.

Another feature of the invention lies in that, once the identity and the condition of the fault wires of the last individual member seized by the common member have been recorded by the auxiliary memory, the member finder releases after a predetermined period of time, the auxiliary memory then being connected to a fault recorder, sending it all the information it had recorded and thereupon releasing, it being possible to provide arrangements to send to said recorder full information regarding the instant at which the fault occurred.

Generally there is only one member finder for each exchange. It follows from this that it is important that its holding time be reduced to a minimum for each fault recording. Further, the time required by the fault recorder to record fault information can be considerable if it is an electromechanical device such as a perforator, a teleprinter, etc.

Another feature of the invention is to associate a plurality of auxiliary memories with the member finder, this arrangement allowing said member finder to be associated with a free memory while some other memory sends the information received to the fault recorder.

In an automatic telephone exchange comprising common and individual members it may happen that two individual members of different kinds, or else one common member and one individual member, can never be connected together either while hunting for the calling line or while hunting for the called line.

Another feature of the invention lies in using the same elements of the auxiliary memory for temporarily recording the condition of the fault wires of a plurality of common or individual members when said members cannot be connected simultaneously either while hunting for the calling line or while hunting for the called line, the purpose of this arrangement being to reduce substantially the size of the memories used.

Whenever a common member controls only a small number of elementary operations, it is superfluous to provide for such common member a time device to control the building-up time of each of said operations.

Another feature of the invention lies in associating with a common member controlling only a small number of elementary operations a time device that will control the time taken to perform the whole of said operations, the operation of that device placing said member in calling position on the banks of the member finder in order to connect it finally to the auxiliary memory.

Various other features of the invention will appear from the description that follows, given as a nonlimitative example with reference to the accompanying drawing, in which:

Figs. 1 and 2 are wiring diagrams used to explain the general operation of the system;

Figs. 3 to 8, a schematic of the devices provided for finding and recording faults in the common or individual members of the exchange;

Figs. 9 and 10, summary tables that allow explaining the method of wiring certain members of the above-mentioned device;

Figs. 11 and 12, a simplified diagram of the recording form;

Figure 1:
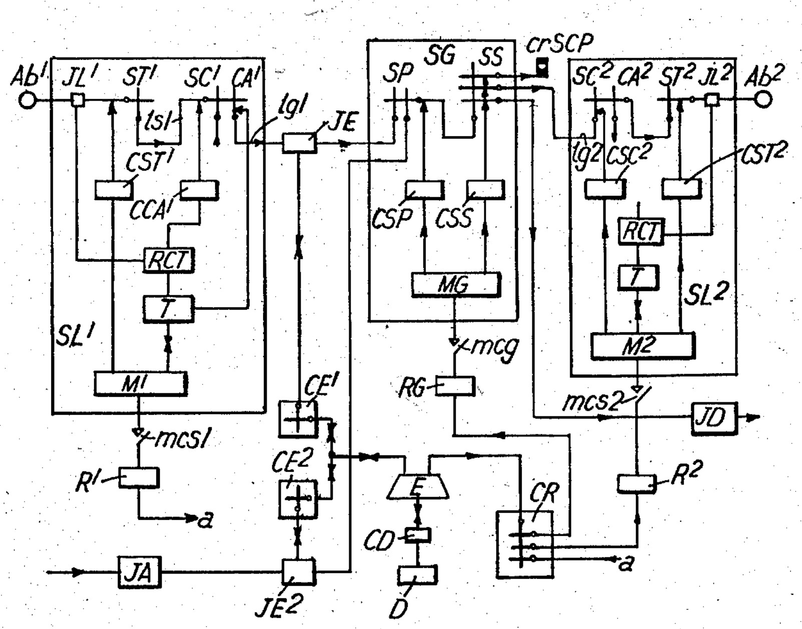

The general operation of the system will now be described with reference to Fig. 1.

Throughout what follows, the term "connector" will be used to designate a set of members arranged at the end of a circuit or of a line and intended to connect said circuit or said line to a particular equipment of the exchange.

In the description that follows, we shall first of all recall in summary fashion the arrangement of the members and the methods for routing calls in an automatic telephone exchange using crossbar switches or "multiselectors." Detailed descriptions of exchanges of this type may further be found in French patent applications 666,786 and 667,417 and in certificate-of-addition application 687,167/1,069,160, filed by applicant on April 7, 1954, April 16, 1954, and March 9, 1955.

The automatic switchboard involved serves a certain number of subscribers divided up into groups. A group-selecting means chooses the group comprising the called subscriber, a line-selecting means choosing the called subscriber from among all the subscribers in the group involved.

When the calling subscriber A*b*1 removes his handset, his line equipment L1 is connected to common test relays R, C, T. The latter determines the split of call finders CA comprising free call finders having access to free registers. The common test relays are thereupon connected to a tester T charged with hunting for a free call finder having access to a free register in the call-finder split determined as above indicated. The tester is connected to one of the line markers ML1 controlling the line-selecting means to which the calling subscriber is connected.

Register connector JE, associated with the call finder CA1 chosen, is seized and is connected to a register E through a register finder CE1.

The marker seized then places the line in calling position on the banks of the final selectors ST1 serving the calling subscriber. The connector CST1 serving the final selectors places in calling position on the banks of call finders CA1 the free final selectors ST1 capable of routing the call.

The call-finder connector CCA1 of the chosen call-finder frame hunts for a final selector ST1 among those in calling position, at the same time that the hunting for the calling subscriber's line is done by the final-selector connector CST1.

The marker seized causes the energization of the call finder's connecting magnet, then that of the final selector's connecting magnet and thereupon that of the calling subscriber's cut-off relay.

The calling subscriber is now connected to a register E, while the tester and the marker are released.

The calling subscriber then dials the called number. As soon as register E has received the number's portion enabling it to control the group-selecting operations, it is connected to a group-selection receiver RG through a receiver connector CR. Register E then sends in coded form to this receiver the selective combinations required for the control of the group selection. After learning the identity of the group-selecting means SG seized by register connector FE, receiver RG is connected to one of the two markers MG (only one of them is shown in Fig. 1) serving said group-selecting means SG, over connecting circuit *mcg*.

The marker MG seized receives from receiver RG the coded information relative to the group selection and controls said selection through first-selector connectors CSP and second-selector connectors CSS.

Marker MG and group receiver RG thereupon release.

When the register has received the whole called number, it is connected to a line receiver R2 through receiver connector CR and sends it in coded form the selective combinations required for controlling the line-selection operations. Receiver R2 is connected to one of the two markers M2 (only one of them is shown) serving the line-selecting means to which the called subscriber is connected. Marker M2 chooses a final selector ST2 capable of routing the call and, after making sure that the line of called subscriber A*b*2 is free, controls the establishment of the connection through fifties selector SC2 and final selector ST2. The called subscriber is rung and the connection is established in accordance with a known method, while marker M2, receiver R2, register E and receiver connector CR release.

Let it be explained further that calls coming from circuits are routed either by a group-selecting means and a line-selecting means, in the case of a call over an incoming circuit, or only by a group-selecting means, in the case of a call passing in transit through the exchange involved. Moreover, calls to special services are routed by a line-selecting means (to which the calling subscriber is connected) and a group-selecting means as appears from examination of Fig. 1, where said special services are represented by a line provided with a jack referenced SCP.

Let it be recalled that, save in the case of local calls or of incoming calls, register E is always associated with a translator D through a translator connector CD, as moreover explained in detail in the aforementioned patent applications.

As appears from the foregoing description, it will be noted that two consecutive stages can be distinguished in the sequence of operations that develop upon the establishment of a local connection.

The first stage extends from the moment the calling subscriber lifts his handset to the connection of said subscriber to a free register. The second stage involves the dialing proper by the calling subscriber and the hunting for the called subscriber.

In other words, it may be said that the first stage involves the hunting for the calling line, this hunting taking place under the control of two essential members: tester T and line marker ML1. The second stage occurs under the control of the register, associated in succession either with a group receiver and a marker, in the course of the group-selection operations, or with a line receiver and a marker, in the course of the line-selection operations.

In order to ensure proper operation of the various members involved in the establishment of a connection, some of them comprise time devices whose function is to check that each elementary operation controlled thereby is performed in less time than a predetermined limit. The above-mentioned time devices are included in the common members involved in the establishment of a connection. It will be recalled that these common members are essentially the tester and the register.

These members therefore comprise for this purpose a time relay whose operating time is greater than that of the elementary operations that normally must develop without incident. As regards the tester, the number of elementary operations that must develop from the seizure of said tester to the connection of the calling subscriber to a register is relatively small. It follows that for reasons of simplification and of economy the tester or testers are provided with a time relay that is switched in from the seizure of said tester, the return to zero of this relay occurring only once—upon the release of the tester. Stated otherwise, said time relay checks the total holding time of the tester or, what amounts to the same, the sum of the elementary times required for the building up of the elementary operations controlled by said tester.

As regards the register, the number of elementary operations it controls is large and said operations are of a highly different nature. Thus, in the case of a local call the register controls two selection operations, one group-selection operation and one line-selection operation, and said operations can in turn be subdivided into elementary operations. For this purpose, arrangements are provided to return the time device to zero a number of times in succession, the number of returns to zero being equal to the number of elementary-operation cycles controlled by the register.

Therefore, the fact that the time device operates, either in a tester or in a register, shows the existence of one or more faults preventing an elementary operation either from being performed within a predetermined time or from being performed at all, without however affording the possibility of tracing the fault, which latter can occur either in a common member or in an individual member (marker, receiver . . . ) temporarily associated with said common member.

It should be pointed out in this connection that a given fault can occur in a common member, in a tester, for example, when the latter is associated with a given marker, although with other markers the selection operations will be performed without incident. This amounts to saying that such faults result from the association of two quite specific members, while each of said members, if separately associated with other members in good condition, will not give rise to any operating trouble.

In order to be able to trace the fault, each member, be it common or individual, has been provided with a certain number of so-called fault wires, normally isolated but brought successively to fixed potentials and thus characterizing the successive phases of the trouble in a given cycle of elementary operations, the application of voltage to these characteristic wires being effected by the relays whose function it is to control the starting of the various elementary-operation cycles mentioned above.

Figure 2:
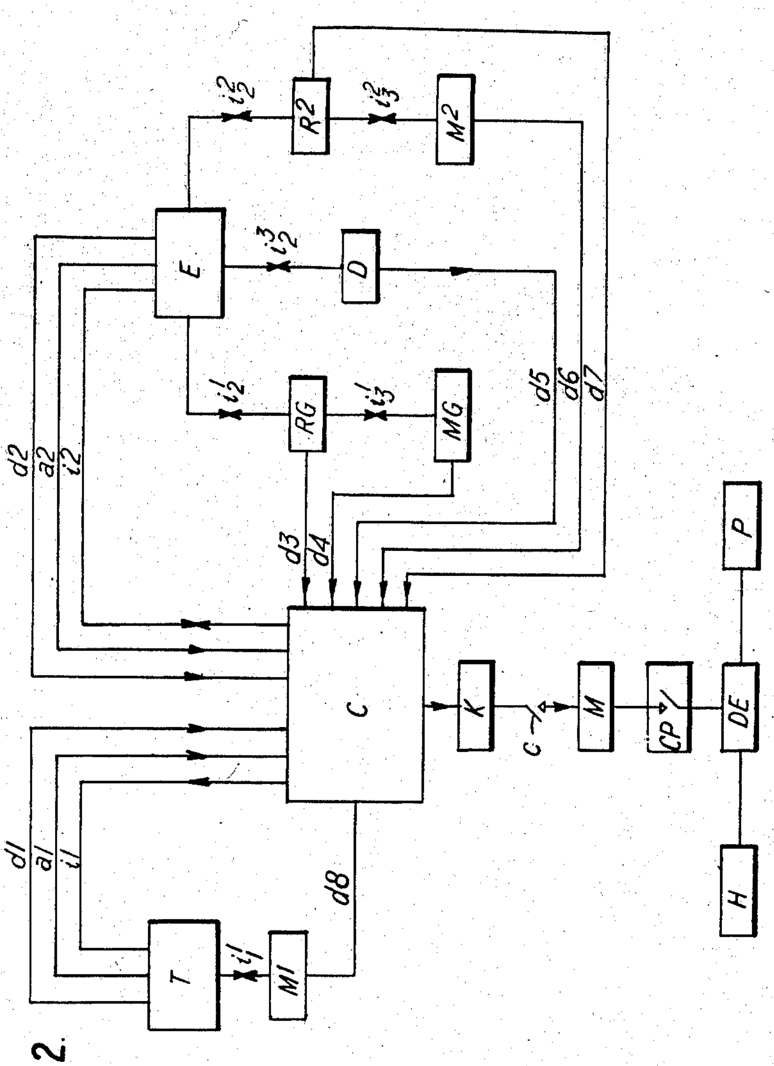

Whenever a fault occurs in a common or an individual member, the time device comprised in the common member, whether associated or not with an individual member, operates and brings said common member into calling position on the banks of a member finder C (Fig. 2).

To explain, it will be assumed, as an example, that in the course of putting through a local call the time device comprised in the seized register operates at such a moment that said register has just been associated with a line-selection marker (M2 in Fig. 1). This assumes by implication, as follows from the foregoing description, that register E has first been associated with a line receiver (R2 in Fig. 1).

From the operation of the time device, a special potential is applied to wire *a*2 (Fig. 2), this bringing register E into calling position on the banks of member finder C. Member finder C can be associated with two identical memories. As soon as it is seized, it tests both memories simultaneously in order to determine which of them will be used for recording the fault. Once it has chosen one of the two memories (such as M in Fig. 2), the member finder connects the fault wires, such as *d*2, issuing from register E to memory M through a coding device referenced K in Fig. 2. This coding device is used to send to memory M coded information that will allow determining the identity of the calling register E. Once the connection between register E and memory M has been made, member finder C sends a characteristic potential to register E over an identification wire *i*2. The bringing of this characteristic wire to a special potential serves two purposes: (1) to start in member finder C a time device that is to cause the slow release of said member finder C and (2) to cause in succession the bringing into calling position of the individual member or members that may happen to be seized by register E at the instant involved.

The above-mentioned identification wire *i*2 is extended to line receiver R2 (wire $i_2{}^2$) and to line marker M2 (wire $i_3{}^2$), since at the instant involved a connection is established between register E, line receiver R2 and line marker M2 through a receiver connector not shown in Fig. 2. The bringing of identification wire *i*2 to a characteristic potential causes in each of the two individual members presently seized by the register the operation of calling relays comprised in each of said members.

Line receiver R2 is immediately brought into calling position on the banks of member finder C, while the bringing into calling position of the marker is deferred, arrangements being provided to delay this bringing into calling position until receiver R2 has been connected to coder K and to memory M.

Member finder C then proceeds to hunt for the calling receiver without first having hunted for a memory. This latter hunting is actually useless, because the capacity of the memories used is such that one memory alone is sufficient to record simultaneously the information concerning a common member associated with two individual members (for example, a register associated with a receiver and with a marker). It follows that the memory chosen first, at the time register E was brought into calling position, will also be used for the recording relative to line receiver R2 and, subsequently, to line marker M2.

It was pointed out before that the bringing of identification wire *i*2 to a characteristic potential was intended to start the operation of a time device causing the slow release of member finder C. If an individual member, say line receiver R2, is brought into calling position on the banks of member finder C, the above-mentioned time device is returned to zero. Owing to this fact, the member finder C seized by the register is not released.

As soon as a connection has been established between line receiver R2 and memory M through coder K, the time device releasing the member finder is brought back into operation.

Line marker M2 is then brought into calling position on the banks of member finder C, while the time device releasing said finder C is returned to zero.

In the same manner as previously described in connection with register E, marker M2 is connected to memory M through coder K, while the time device releasing member finder C is brought back into operation.

At this moment common member E and individual members R2 and M2 have just been connected to memory M through coder K. The hunting by member finder C has at present ended. At the end of a certain period, the above-mentioned time device operates and causes the release of finder C.

The release of member finder C involves the seizure of a perforator P. The information recorded in coded form by memory M is then sent to this perforator through connector CR and across a decoder DE.

No description will be given of perforator P, which is of the classical type providing perforated records identical in every respect with those currently used in mechanical recording.

The fact that coded information is sent to perforator P allows reducing considerably the capacity of connector CP.

When recording a fault, it is important to know the day and the time it occurred. Accordingly, a clock H is provided that gives coded information making it possible to learn with every desirable degree of accuracy the instant at which the fault occurred. This information is sent to the perforator through decoder DE.

As soon as it is seized, the perforator starts recording on a recording form. The information recorded in succession on the form is, for the example chosen:

(1) Information on the instant the fault occurred, that is, the day, the hour, the minute, etc.

(2) Identity of the calling register.

(3) Identity of the receiver R2 associated with register E.

(4) Identity of the marker M2 connected to receiver R2.

(5) Identity of the first, second and everflow frames to which the marker M2 is connected.

(6) Position of the components of the common member (register E) and of the individual members (receiver R2, marker M2). As is known, the position of these components is given by analyzing the above-mentioned fault wires.

Once all this information has been recorded on the recording form, the latter is ejected by the perforator, which then returns to normal and is released, its release entailing that of memory M. The fault-recording device is free again.

It has been previously assumed that when register E was brought into calling position, it was connected to a line receiver R2 and to a line marker M2. It may happen, for example, that the connection of receiver R2 to marker M2 has not actually been made when register E is brought into calling position on the banks of member finder C. In that case, all the above-described operations up to the instant receiver R2 is seized developed in identical fashion. It has been pointed out before that from the connection of receiver R2 to memory M, the time device bringing about the slow release of member finder C was brought back into operation. Considering that no marker is seized by the receiver involved, the above time device cannot be returned to zero and it will start operating at the end of a certain period of time, thus causing the release of finder C and the connection of memory M to perforator P in accordance with a method identical with the one already described.

When the calling common member is a tester, the fault finding and recording operations develop in identical fashion. The essential difference is due to the fact that the tester can be connected only to a line marker.

A detailed description of the operation of the system will now be given with reference to Figs. 3 to 8.

In the descriptions that follow, the relay windings are identified by a letter combination comprising two capital letters followed by one or more small letters. The first capital letter characterizes the equipment in which the relay is used. All relays forming part of one and the same equipment therefore bear a reference beginning with one and the same letter. For equipment and wiring reasons, the relays of each equipment are divided into groups, all the relays in one group being fixed on the same bar. The second reference capital letter of the relays characterizes this bar. All the relays of one and the same bar therefore bear one and the same second capital letter. The small letters following the first two capital letters in the reference of a relay designate the contact assemblies associated with the respective relay. On one and the same bar, the contact assemblies of the various relays are referenced in alphabetical order. Thus, on bar A of equipment C, if the first two relays each have two contact assemblies, and the next two only one each, the references used will be:

First relay—CA*ab*
Second relay—CA*c*
Third relay—CA*d*
Fourth relay—CA*e*

The relay contacts are referenced as follows: for a given contact assembly associated with a given relay, the contact references are obtained by having the two capital letters comprising the first portion of the relay reference followed by the small letter characterizing the contact assembly involved and by a figure identifying the contact in the assembly in question. Thus, contacts CA*a*2 and CA*b*3 are respectively the second contact in assembly *a* and the third contact in assembly *b* of relay CA*ab*.

In some cases, for the sake of simplification, similar members or circuits performing identical functions are shown as a single member or circuit of each kind.

Only the first and the last member have been referenced in this particular case, the references being separated from each other by a fraction bar. Thus a relay whose winding is referenced CP*a/e* actually represents five relays referenced CP*a*, CP*b* . . . CP*e*. Likewise, a relay contact referenced CI*a/j*, 2/11 actually represents the second, third . . . eleventh contacts of relays CI*a*, CI*b* . . . CI*j*, or a total of 100 contacts (10 relays, 10 contacts per relay).

To make the drawing clearer, certain wires intended to provide electrical connections between distant members have been grouped into cables. These cables are referenced by capital letters. The wires in a cable are referenced by a small letter preceded by the capital letter identifying the cable.

The make-up of a memory, among other things, will be described in what follows. In view of the large number of relays making up this memory, the windings of these latter have been referenced MK*m*1 . . . MK*m*104. Each of these relays has one front contact. These contacts have been referenced MK*m*1/1 . . . MK*m*104/1, which allows simplifying considerably the references used.

As will be seen later on, the member finder is equipped with a multiselector frame. Within this frame are a certain number of selecting magnets.

These magnets are divided into two groups: a group of "low" magnets and a group of "high" magnets. These magnets are referenced C*sb*1 . . . C*sb*14, C*sh*1 . . . C*sh*14, the small letters *b* and *h* comprised in the references designating the "low" and the "high" magnets, respectively. The front or back contacts associated with these magnets are referenced C*sb*1/1, C*sb*1/2, the second figure designating the serial number of the contact in the assembly with which it is associated.

The battery normally used for the general supply of the system has its negative pole represented by an arrow; its positive pole is connected directly to ground.

It will be assumed as a nonlimitative example that the particular exchange to which the present invention is applied comprises 5,000 subscribers as a maximum. These subscribers are divided into 10 groups of 500 subscribers each, each group being selected by a group-selecting means SG (Fig. 1) of a group-selecting set. In the case of a local call, the called subscriber is then hunted for by a line-selecting means.

As already pointed out before, the members coming into play in the selection chain of the exchange discussed above can be divided into two kinds:

(1) Common members—testers, registers.

(2) Individual members—receivers, translators, markers.

Figure 4:
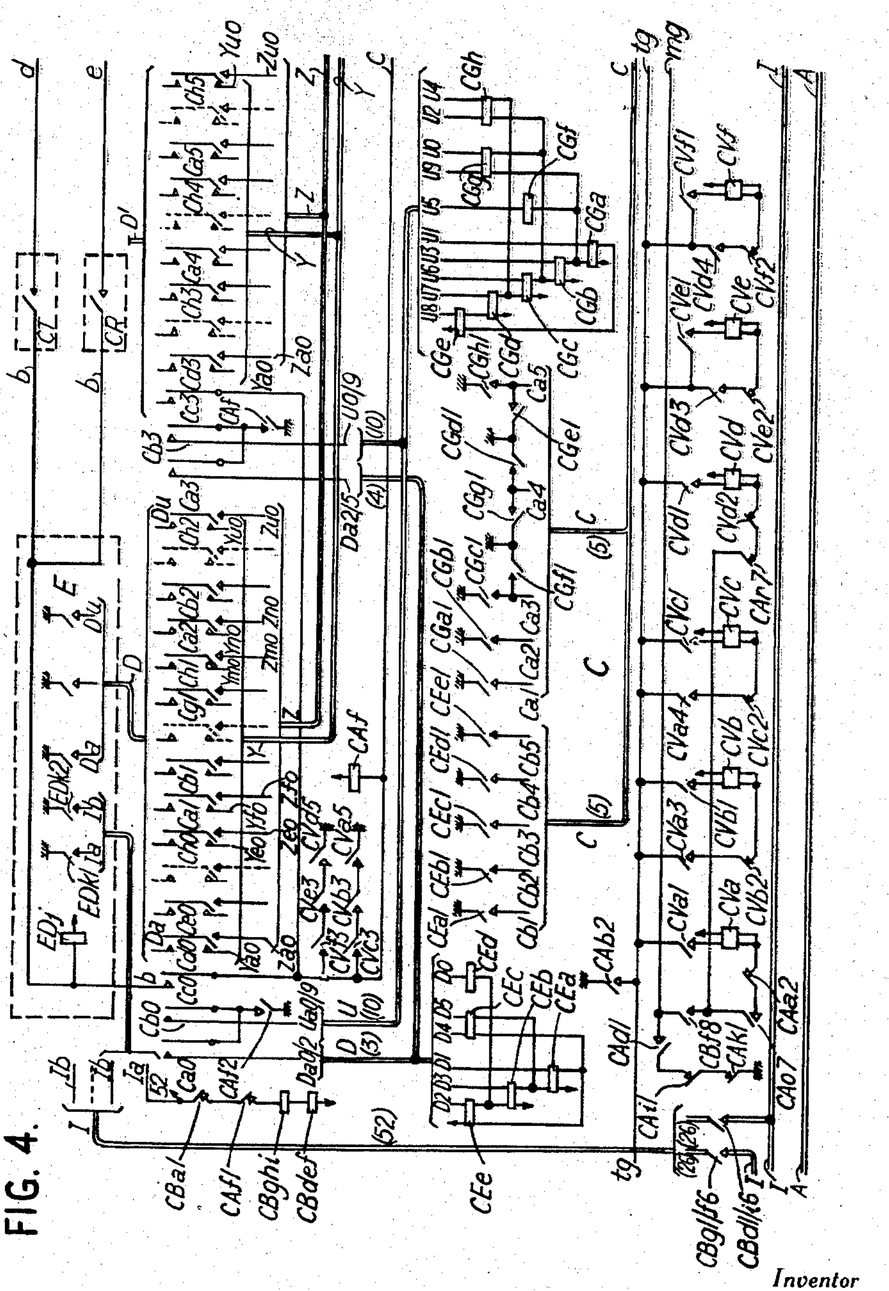

These members, which form no part of the present invention, are represented by rectangles referenced by the following letters:

(1) E, for the registers (Fig. 4).

Figure 7:
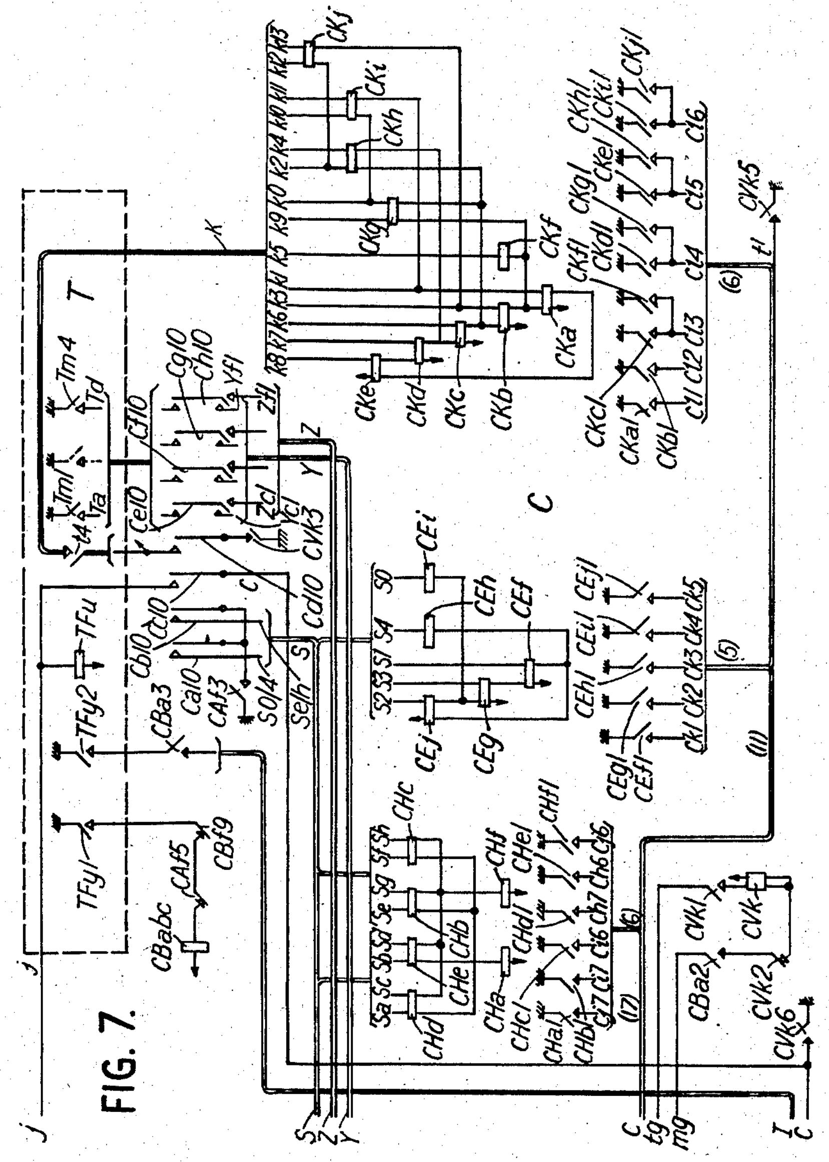

(2) T, for the testers (Fig. 7).

Figure 5:
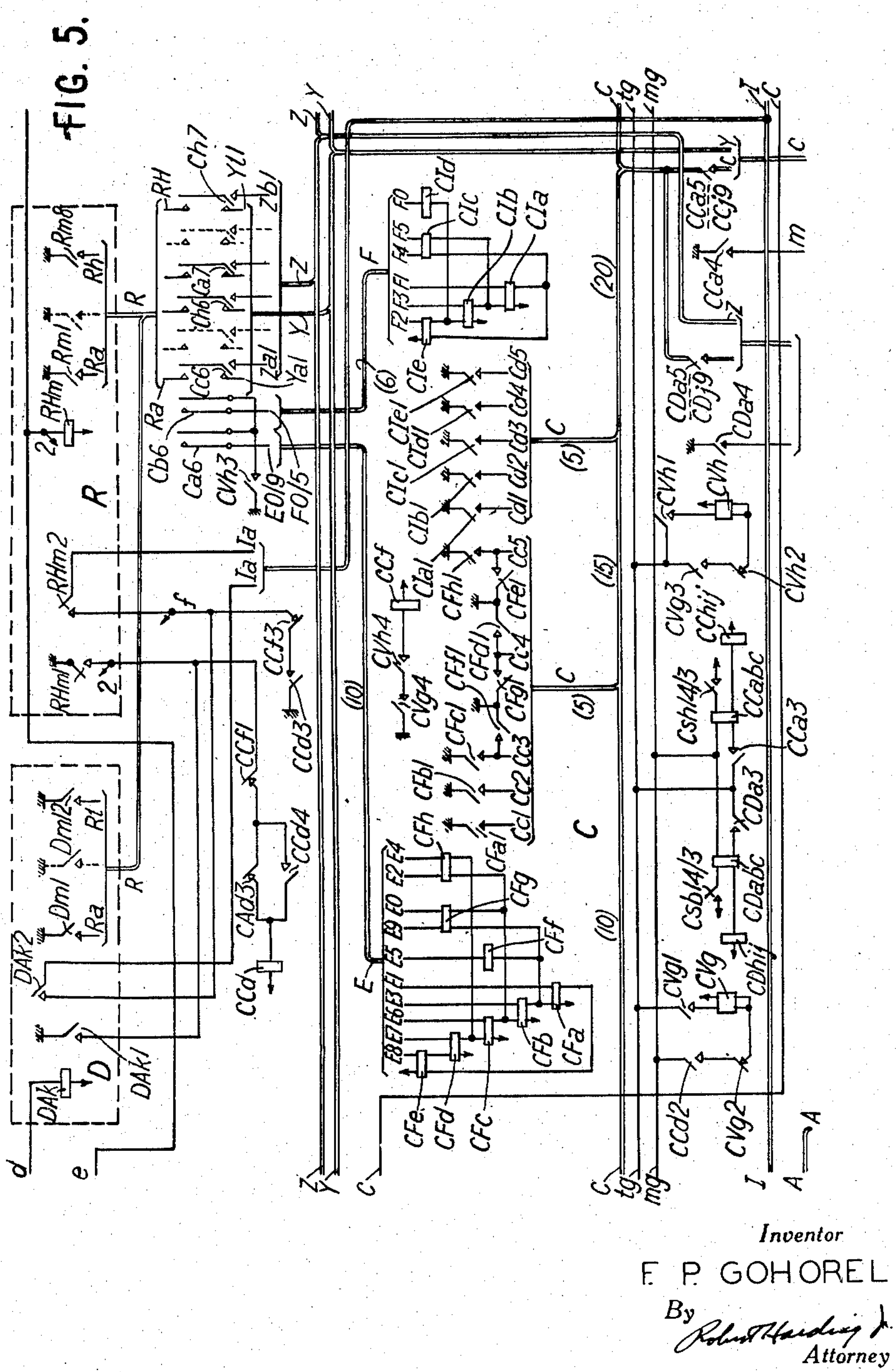

(3) R, for the line or group receivers (Fig. 5).

Figure 6:
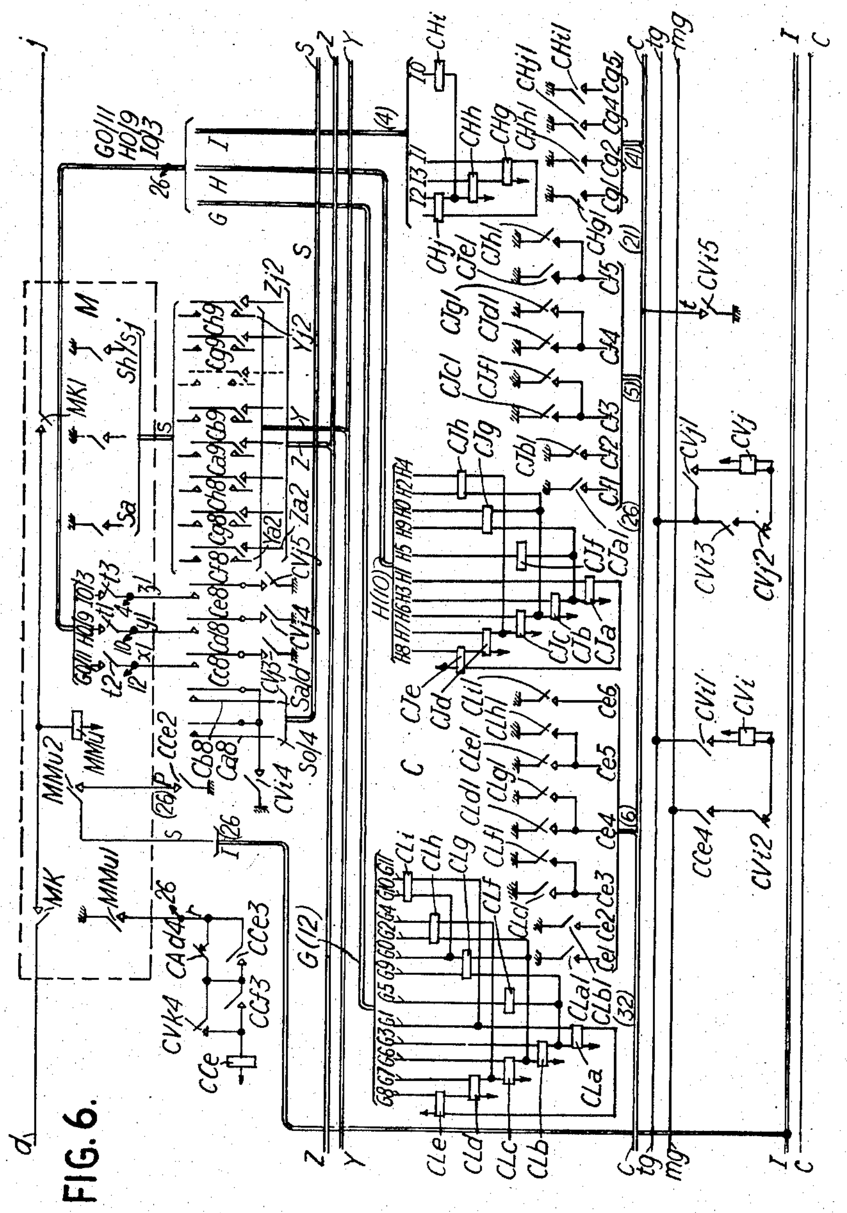

(4) M, for the line or group markers (Fig. 6).

(5) D, for the translators (Fig. 5).

However, within these rectangles are shown the circuit components required for an understanding of the system.

Before discussing in detail the operation of the various circuits forming the object of the present invention, the code will be explained that is used for recording on the recording forms the various pieces of information that the device can record.

Figure 11:
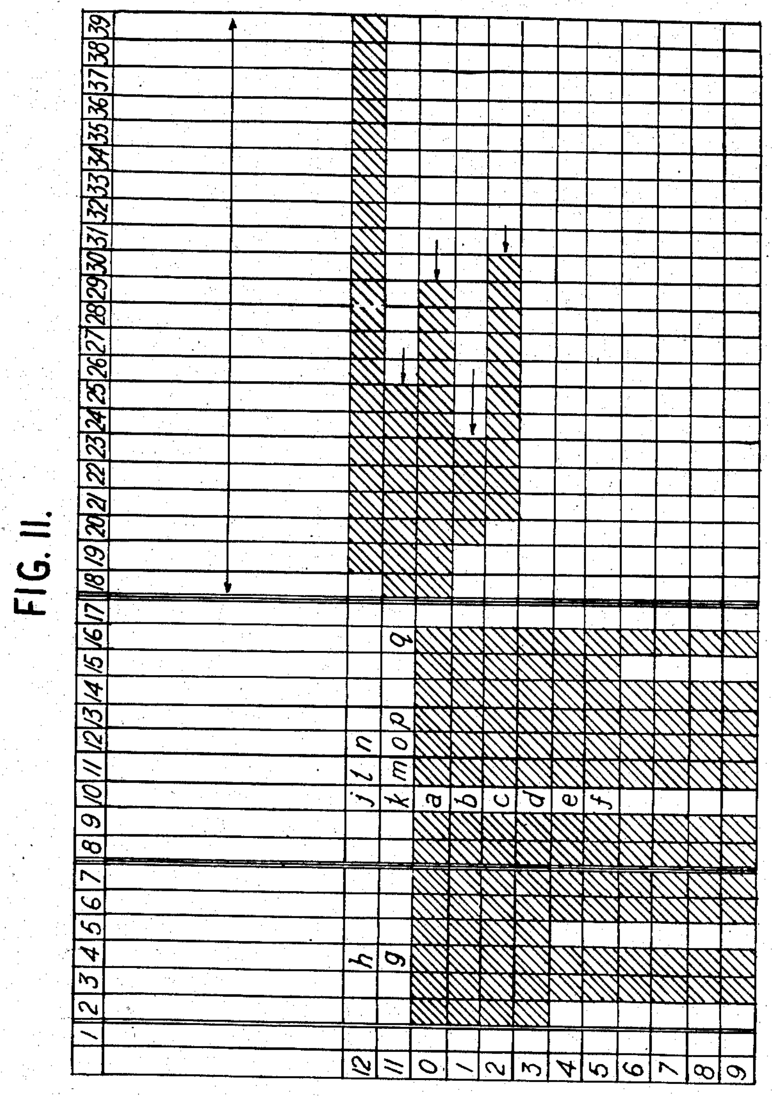

For this purpose, Figs. 10 and 11 shown schematically a recording form identical with those currently used in mechanical recording. As is known, these forms are divided up into a certain number of boxes, each intended to record either partial information or complete information. In practice, each form contains 10 horizontal lines and 80 columns, this providing 800 boxes. However, thanks to a trick currently used, the capacity of these forms can be tripled by providing two additional horizontal lines, which, combined with the 80 columns mentioned above, thus give 160 additional boxes. It should further be explained that the above additional lines are used only in certain special cases where it is necessary to record in a given column some particular information that can depend on a number of parameters. Along this order of ideas may be mentioned for example the case of alphanumerical tabulating machine.

As is common usage, the lines are numbered from 0 to 9 from top to bottom and the columns from 1 to 80 from left to right. The additional lines are numbered 11 and 12 and are placed above the 10 normal lines previously mentioned.

As indicated above, a punching is provided in each column for the recording of partial or complete information, a punching that can be effected in any of the ten boxes mentioned above, it being further possible to associate this punching with an additional punching in either of the two boxes of additional lines 11 and 12.

In order to make it easier to understand the method of recording information relative to member faults, hatching is used for the boxes intended to receive punching characterizing either numerical values, such as the number of the receivers or the markers, or else the result of an operating test, such as the presence (punching) or the absence (no punching) of a particular potential on a fault wire, as already stated in the general description of the operation of the system.

The above-mentioned boxes are therefore provided to record either information of a purely numerical nature or information revealing the presence or the absence of a particular potential on a fault wire.

Other boxes contain small letters characterizing punchings relative to information either of a particular character, concerning the nature of a faulty member, for example, or of a complementary character, concerning an additional box such as those mentioned above.

In order to explain, consideration will now be given to the whole information that can be recorded during fault-recording operations.

(1) Column 1: This column is provided to characterize the nature of a faulty member. The letter *w* characterizes the recording of a fault.

(2) Columns 2 to 7: These columns are provided to record the instant of a fault. For this purpose, provision is made to record the day of the month (columns 2 and 3 for tens and units), the hour (column 4 for units and tens), the minutes (columns 5 and 6 for tens and units) and, finally, tenths of a minute (column 7). As regards the recording of hours, it will be noticed that a single column is provided, while the figure representing this magnitude may be comprised between 0 and 23. Discrimination of the tens comprising the hour figure is provided for by providing in the corresponding column (4) a punching in one of the two additional boxes of lines 11 and 12. These punchings, referenced *g* and *h*, are made in accordance with the following code:

(*a*) Tens digit comprised between 00 and 09, no punching in the additional boxes.

(*b*) Tens digit comprised between 10 and 19, punching in box *g*.

(*c*) Tens digit comprised between 20 and 23, punching in box *h*.

(3) Columns 8 and 9: these columns are provided to record the tens and units digits making up the numbers of the registers of the exchange. In principle, the identity of a maximum of 100 registers (number comprised between 00 and 99) is recorded. However, this number can be doubled by providing a punching in an additional box (*i* in Fig. 9).

(4) Column 10: this column is provided for two uses:

(*a*) To record the category of the receiver or of the translator.

(*b*) To record the 500-subscriber group with which the line marker is engaged.

These various recordings are punched in box *a* or *b* for the 5000-line group with which the line receivers can be associated (first or second 5000-line group in a 10,000-line exchange), *c* or *d* for identifying the group-selection stages (first or second) to which the group receivers are connected, *e* or *f* for identifying the two translators usually comprised in 10,000-line exchanges, and *j* or *k* for identifying within a thousand the 500 lines of the group serving the called subscriber, this referencing thus serving to identify the two line markers associated with said 500-line group.

(5) Column 11: this column is for recording the numbers of the receivers or of the testers. Further, punchings are made in boxes *l* and *m* to show which of the two testers of the line-selecting means is used in the hunting for the calling line.

(6) Column 12: this column is for recording the number of the thousand of which the line markers and the testers can be connected. In addition, punchings are made in boxes *n* and *o* to show which of the two markers of the group-selecting or of the line-selecting means is used.

(7) Columns 13 and 14: these columns are for recording the numbers of the first and second multiselector frames seized. Since these numbers can be comprised between 00 and 19, additional boxes *p* are punched whenever these numbers are comprised between 10 and 19.

(8) Column 15: this column is for recording the numbers of the overflow multiselector frames that may possibly be used for routing a call.

(9) Column 16: this column is for recording the numbers of call finders. Box *q* is punched whenever the number of the call finder is comprised between 10 and 19.

(10) Column ("skip" column) 17: Since this column is not for recording any information, it is "skipped" by the perforator. The method of skipping this column will not be explained subsequently.

Figure 12:
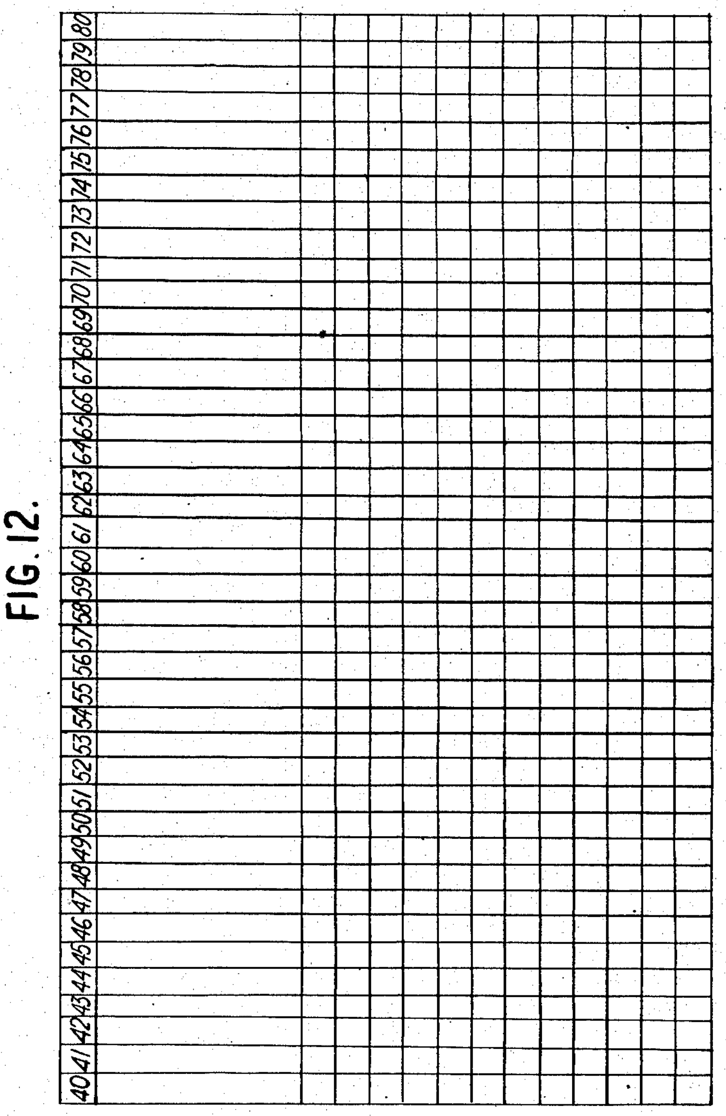
Figure 13:
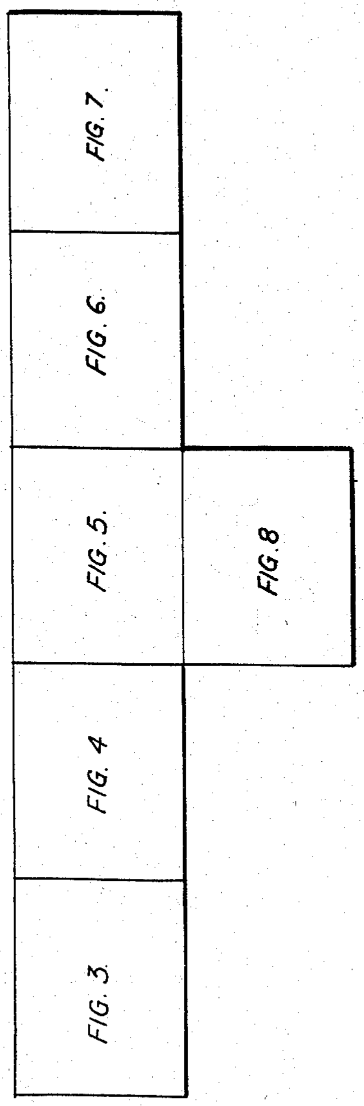
Fig. 13 shows how to associate Figs. 3 to 8.
Figure 14:
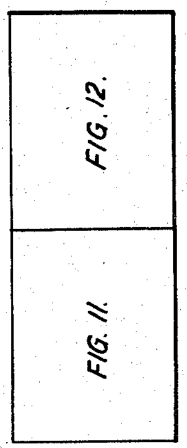
Fig. 14 shows how to associate Figs. 11 and 12.

(11) Columns 18 to 39: these columns are used for recording the characteristic potential of the aforementioned fault wires. The corresponding recording is done on lines 0, 1, 2, 11 and 12, as examination of Figs. 11 and 12 will show.

(12) Columns 40 to 80: these columns are not used.

The operation of the system will now be described in detail by assuming that, in the course of putting through a call, the time device comprised in the register E seized shows the holding time of line marker M2 to be abnormally long (Fig. 1). This time device, consisting of a relay in whose coil a condenser discharges, is not shown in the rectangle referenced E in Fig. 4. It will be assumed, by way of example, that the number of registers that can be associated with the fault-recording device forming the object of the invention is 52, as a maximum. These registers are numbered from 00 up for the first and from 51 up for the second fifties. It will be assumed by way of example that the register seized in putting through the call here involved bears the number 00. Rectangle E will therefore represent said register in Fig. 4. In this rectangle are shown only the contacts or the windings of the relay whose presence is necessary for an understanding of the present description.

ED*k*1 and ED*k*2 are the front contacts that close whenever the time device, not shown but comprised in the register, operates owing to the abnormal development of the operations involved in the routing of a call.

In the example chosen, these contacts will therefore close whenever the register is engaged with a line marker through a line receiver and a receiver connector.

The effect of the closing of front contact ED*k*1 is to complete the energizing circuit of ringing relays CB*def* and CB*ghi* (Fig. 4): battery, relays CB*def* and CB*ghi* in series, back contacts CA*f*1, CB*a*1, wire I*a* through cable I, front contact ED*k*1, ground.

The pulling up of ringing relays CB*def* and CB*ghi* tells member finder C, whose circuits are shown in Figs. 3 to 7, that a register has just detected a fault and has accordingly taken the calling position on the banks of said member finder. The two relays CB*def* and CB*ghi* are all there are for the 52 registers that can be associated with member finder C, so that wire I*a*, issuing from back contact CB*a*1, is multiplied to the 52 registers E, whereof only one is shown in Fig. 4.

In order to determine the identity of the calling register, an identification wire, referenced I*b* in rectangle E, is associated with each register. There are therefore 52 wires such as I*b*, whose relays CB*def* and CB*ghi* provide the connection to selecting magnets CS*b*1 . . . CS*h*13 through their 52 front contacts CB*d*1/10, CB*e*1/10, CB*f*1/6, CB*g*1/10, CB*h*1/10, CB*i*1/6, shown in Fig. 4 as two front contacts referenced CB*d*1/*f*6 and CB*g*1/*i*6.

The following table shows, besides, in order to make it easier to understand the description, the relationship between ringing wires I*b* of registers 00 . . . 51 and the corresponding contacts of ringing relays CB*def* and CB*ghi*.

| Number of registers: | Relay contacts |
|---|---|
| From 00 to 09 | CB*d***1** to CB*d***10** |
| From 10 to 19 | CB*e***1** to CB*e***10** |
| From 20 to 25 | CB*f***1** to CB*f***6** |
| From 26 to 35 | CB*g***1** to CB*g***10** |
| From 36 to 45 | CB*h***1** to CB*h***10** |
| From 46 to 51 | CB*i***1** to CB*i***6** |

The energization of ringing relay CB*def* further causes, through the closing of its front contact CB*f*7, the energization of general holding relay DA*ab*, which pulls up (Fig. 3): battery, resistance CR54, relay CA*ab*, front contact CB*f*7, ground.

Before proceeding with this description it is well to explain that the finder used for hunting for faulty common or individual members is of the crossbar type, sometimes called a multiselector.

It will be recalled in this connection that a multiselector frame consists essentially of a certain number of individual selectors each provided with a so-called connecting magnet. With the set of individual selectors are associated so-called selecting bars, each controlled by 2 selecting magnets. The number of selecting magnets is moreover, in accordance with a known method, equal to the number of movable-contact assemblies making up each individual selector.

The contact assemblies are usually identified by assigning them a serial number characterizing their respective azimuths. The fixed-contact assemblies, equal in number to the movable-contact assemblies, are multiplied to one another vertically. It will be recalled that in order to prepare the connection of a movable-contact assembly of a selector to the corresponding fixed-contact assembly, the selecting bar associated with said contact assemblies is operated by energizing the selecting magnet whose azimuth is the same as that of those contact assemblies whose connection it is desired to cause subsequently.

In accordance with a known method, the operation of the selecting bar entails the placing in operating position of all the clutches associated therewith, the number of these clutches being of course equal to the number of individual selectors making up the multiselector frame. Upon energizing thereupon, following the suitable positioning of the selecting bar, the connecting magnet of the previously-designated selector then makes effective the connection of the corresponding movable- and fixed-contact assemblies. It is then possible to release the selecting bar that has just been used, the clutch that served to control the connection remaining in operating position thanks to a well-known mechanical device.

The multiselector frames are so mounted on bays that the selecting bars will be horizontal. In accordance with a known method, a selecting bar can take three positions: a normal position, a first operating position, with the clutch in high position, and a second operating position, with the clutch in low position. Two selecting magnets are associated with each selecting bar. It is well to point out that by design the clutches associated with the selecting bars move in vertical planes and that the two selecting magnets controlling them must be so energized that it will be necessary to energize the lower magnet in order to move the clutch upward and conversely.

Throughout what follows, the selecting magnets controlling the downward and upward movement of the clutches associated with the corresponding selecting bar will be called the "low" and the "high" magnets.

It is known that usually it is the practice to multiple to one another movable-contact assemblies having one and the same azimuth, so as to allow a given azimuth to be served by a plurality of individual selectors. However, for certain special uses, and particularly for the one forming the object of the invention, such multiplying is not done.

It will be assumed in what follows that the multiselector frame used for the embodiment of member finder C consists of 11 individual selectors, each consisting of 28 fixed- and movable-contact assemblies, each assembly comprising 8 contacts. From what has been said before, it follows that there are 28 selecting magnets and 14 selecting bars.

As has been stated in the aforementioned addition applications, the number of fault wires provided in the registers is 21. These wires are referenced D*a* . . . D*u* in rectangle E of Fig. 4. The method of connecting these wires is as follows: the 52 registers that can be associated with member finder C are divided up into two groups of 26 each. With each register in a group is associated one azimuth, namely, to explain, azimuth 1 with register 00 . . . azimuth 26 with register 25. An identical distribution is provided for the 26 registers of the second group, namely: azimuth 1 for register 26 . . . azimuth 26 for register 51. Stated otherwise, each azimuth is served by two registers, one from the first group of 26 and the other from the second group of 26.

It should further be pointed out that throughout what follows the azimuths in a multiselector frame will be counted vertically from top to bottom. Stated otherwise, the first contact assembly of each selector located at the top of the frame corresponds to azimuth 1, the second to azimuth 2, and so forth.

Moreover, since one azimuth is provided per register in a group of 26 registers, it follows that the registers having an even azimuth (that is to say, the registers bearing the numbers of 01, 03 . . . 25) will be connected by energizing the "low" selecting magnets, because the first azimuth is reached by energizing a "high" selecting magnet. The reverse result is arrived at for the registers having an odd azimuth.

Considering that in each selector the contact assemblies used each comprise 8 contacts, it is necessary to provide 3 individual selectors for each register, this requiring a total of 2×3=6 individual selectors to connect the 52 registers that can be associated with the member finder. Since 8 contacts per assembly are available in each individual selector, it follows that the simultaneous operation of 3 individual selectors will cause the closing of 3×8=24 contacts. Since 21 fault wires must be connected whenever a register is faulty, there are therefore available 24—21=3 additional contacts per azimuth and per 3-selector group. As will subsequently be indicated, these contacts are used (1) to send the identity of the calling register and (2) to cause the possible connection of such individual members as may happen to be engaged with the calling register at the instant under consideration.

The 52 identification wires I*b* previously mentioned are divided up into four 13-wire groups. With each 13-wire group is associated a pilot ringing relay that through its pulling up (1) characterizes the 26-register group comprising the calling register and (2) makes the even-azimuth discrimination. To make matters clear, the table below gives the designation of these relays.

| Pilot Relays | Number of Registers | Azimuth |
|---|---|---|
| CA*s* | 00, 02 . . . 24 | 1, 3 . . . 25 |
| CA*t* | 01, 03 . . . 25 | 2, 4 . . . 26 |
| CA*u* | 26, 28 . . . 50 | 1, 3 . . . 25 |
| CA*v* | 27, 29 . . . 51 | 2, 4 . . . 26 |

It was assumed earlier that the register bearing the identification number 00 had taken the calling position. As has been indicated, this register is associated with an odd azimuth, azimuth 1. From this it follows that pilot ringing relay CA*s* pulls up (Figs. 3 and 4) following the closing of the 52 front contacts CB*d*1/10, CB*e*1/10, CB*f*1/6, CB*g*1/10, CB*h*1/10, and CB*i*1/6 of ringing relays CB*def* and CB*ghi*: battery, relay CA*s*, resistance CR00, wire I*b* relative to register 00, cable I, front contact CB*d*1, cable I up to register E, wire I*b*, front contact ED*k*2, ground.

It is recalled in this connection that it is possible, as reference to a previously-mentioned table will show, to check that front contact CB*d*1 is properly used in the case of register No. 00.

The pulling up of pilot ringing relay CA*s* tells the member finder that the calling register is comprised in the first 26-register group (number comprised between 00 and 25) and that that register is associated with an odd azimuth.

The pulling up of relay CA*s* completes, through the closing of its front contact CA*s*1, the energizing circuit of relay CA*ij*, which pulls up (Fig. 3): battery, chain of back contacts C*sb*1/1, C*sh*1/1 . . . C*sh*13/1, C*sb*14/1, C*sh*14/1, back contacts C*ad*2, CA*k*9, relay CA*ij*, back contact CA*r*9, front contact CA*s*1, ground.

The closing of front contact CA*s*2 completes the energizing circuit of relay CA*mno*, which pulls up: battery, relay CA*mno*, back contact CA*r*8, front contact CA*s*2, ground.

It has previously been pointed out that the pulling up of ringing relay CB*def* had entailed the pulling up of general holding relay CA*ab* through the closing of front contact CB*f*7.

Through the placing in operating position of its front-back contact CA*b*1, relay CA*ab* (1) removes the short-circuit from condenser CC1 and (2) completes the energizing circuit of relay CA*gh*: battery, resistance CR52, relay CA*gh*, front contact CA*b*1, ground.

The pulling up of relay CA*gh* is slowed owing to the presence of condenser CC1 between the terminals of its energizing winding.

A ground is applied to general holding wire *tg* by the closing of front contact CA*b*2.

A holding circuit is completed for relay CA*ab* by the closing of its front contact CA*b*3; battery, resistance CR54, relay CA*ab*, front contact CA*b*3, ground.

Before proceeding with this description, a few explanations will be given regarding the selecting magnets. It will be recalled that any selecting bar is common to all the individual selectors forming part of the multiselector frame. There is one selecting magnet for each azimuth, so that, for the 26 azimuths provided for the connection of the registers, there is a total of 26 selecting magnets, comprising 13 "high" and 13 "low" magnets. These 26 magnets, referenced C*sb*1, C*sh*1 . . . C*sh*13, are not all shown in Fig. 3 but they form a chain whose operating principle is well known. It has been pointed out before that the individual selectors each have 28 fixed- and movable-contact assemblies corresponding to 28 azimuths, 26 of which are used for the registers. The two additional azimuths are reserved, as will be seen later on, for the two memories associated with the member finder. There are two selecting magnets, referenced C*sb*14 and C*sh*14 in Fig. 3, for these two additional azimuths.

Figure 3:
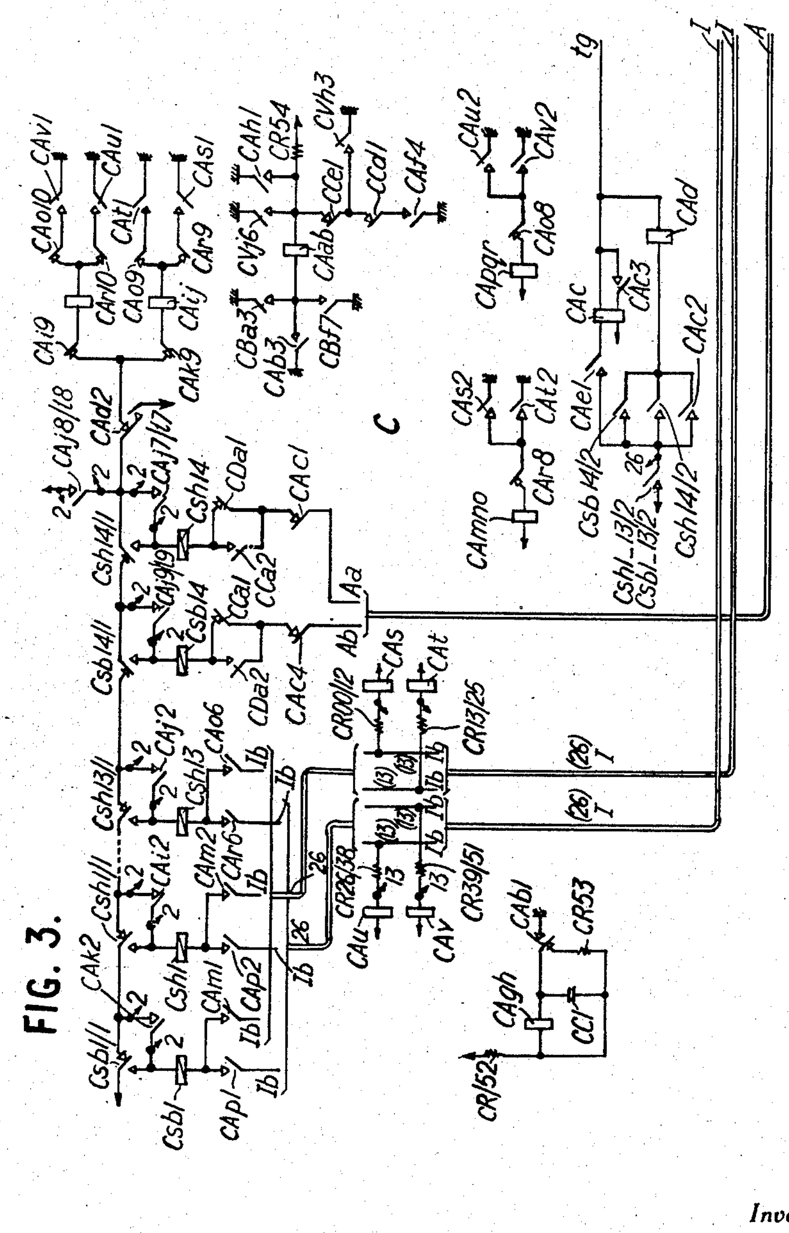

The energization of relay CA*mno* characterizes the group comprising the calling register (here the first 26-register group) and through the closing of its 26 front contacts CA*m*1/10, CA*n*1/10, CA*o*1/6 prepares the energizing circuits of the 26 selecting magnets C*sb*1, C*sh*1 . . . C*sb*13, C*sh*13. Fig. 3 shows only the first and the last of these magnets, that is, magnets C*sb*1 and C*sh*13.

The closing of front contact CA*o*7 prepares the energizing circuit of connecting magnet CV*a* (Fig. 4).

The opening of back contact CA*o*8 locks in normal position relay CA*pqr*, associated with the second 26-register group.

The pulling up of relay CA*ij* will cause the operation of the selecting magnet corresponding to the faulty register.

The opening of back contact CA*i*1 prevents the energization of connecting magnet CV*a*.

The 13 front contacts CA*i*2, CA*i*3 . . . CA*i*8, CA*j*1 . . . CA*j*6 are associated with the 13 energizing circuits of "high" selecting magnets C*sh*1 . . . C*sh*13. Fig. 3 shows only contact CA*j*6, associated with selecting magnet C*sh*13. The effect of the closing of these front contacts is to apply battery potential to all the upper ends of the energizing windings of selecting magnets C*sh*1 . . . C*sh*13, so as to allow the energization of the selecting magnet associated with the faulty register.

It is recalled that that register, bearing the number 00, is associated with azimuth 1, to which belongs selecting magnet C*sh*1.

Magnet C*sh*1 therefore pulls up, its energizing circuit being completed as follows: battery, back C*sb*1/1, front CA*i*2, magnet C*sh*1, front CA*m*2, identification wire I*b* previously mentioned, cable I, front ED*k*2, ground.

The opening of back CA*i*9 locks relay CA*k*1 in normal position.

Relay CA*ij* completes a holding circuit for itself through the closing of its front CA*j*8: ground, front CA*s*1, back CA*r*9, relay CA*ij*, back CA*k*9, CA*d*2, front CA*j*8, battery.

The closing of front contacts CA*j*7 and CA*j*9 completes the energizing circuit of selecting magnets C*sh*14 and C*sb*14. It will be recalled that these selecting magnets are associated with the two memories that can be connected to member finder C. It will be assumed in what follows that both of these memories are free. In order to prevent a double test upon the seizure of one of these memories, priority has been provided for in the order of their seizure.

An availability relay has in effect been associated with each memory. The contacts of these relays are referenced MK*e*1 and MK*e'*1 in Fig. 8. It will be noticed that the two slecting magnets C*sb*14 and C*sh*14 pull up simultaneously (Fig. 3) owing to the closing of the above-mentioned contacts:

(1) Battery, front CA*j*8, CA*j*7, selecting magnet C*sh*14, back CD*a*1, CA*c*1, wire A*a* through cable A, front MK*e*1, ground.

(2) Battery, front CA*j*8, back C*sh*14/1, front CA*j*9, selecting magnet C*sb*14, back CC*a*1, C*ac*4, wire A*b* through cable A, back MK*e'*1, ground.

Through the closing of its front C*sh*14/1, magnet C*sh*14 completes a holding circuit for itself and opens the energizing circuit of selecting magnet C*sb*14: battery, front CA*j*8, C*sh*14/1, selecting magnet C*sh*14, ground over a circuit already described.

Selecting magnet C*sh*14 having its energizing circuit broken, it cannot hold and releases, thereby giving priority to selecting magnet C*sh*14, which holds.

Before proceeding with this description, it is desirable to point out that priority has been provided in the case where registers belonging to two different 26-register groups call the member finder at the same time. It is known that relays CA*mno* and CA*pqr* are actually associated respectively with the first and the second 26-register groups. These relays have their energizing circuits mutually locked through the action of contacts CA*r*8 and CA*o*8 and consequently cannot hold simultaneously, this ensuring the connection of one or the other of two registers that may have taken the calling position simultaneously.

Likewise, two registers of one and the same 26-register group may take the calling position simultaneously. In this case, either one or the other of relays CA*mno* and CA*pqr* pull up (depending upon the calling 26-register group). Priority is provided by the method of wiring the selecting magnets. In fact, as already pointed out, the latter are so arranged as to form a chain in which only one particular relay can hold even if two registers belonging to one and the same 26-register group should call simultaneously. Examination of Fig. 3 will show for example that, in the event of simultaneous energization of selecting magnets C*sb*1 and C*sh*13, with which are associated the registers bearing the numbers 01 and 24 in the first 26-register group, only magnet C*sb*1 will be able to hold, in view of the fact that, through the closing of its front-back contact C*sb*1/1, it breaks the energizing circuit of all the other selecting magnets (C*sh*1 . . . C*sh*13).

The selecting magnet C*sh*1 associated with the register bearing the number 00 completes a holding circuit for itself through the closing of its contact C*sh*1/1, not shown in Fig. 3. Further, this contact C*sh*1/1 plays a role identical with that of contact C*sb*1/1, belonging to selecting magnet C*sb*1 (shown in Fig. 3).

Through the closing of their front contacts C*sh*1/2 and C*sh*14/2, selecting magnets C*sh*1 and C*sh*14 complete the energizing circuit of relay CA*d*, which pulls up (Fig. 3): battery, front C*sh*1/2, C*sh*14/2, relay CA*d*, ground on general holding wire *tg*.

It will be noticed that the energization of relay CA*d* is subject to the pulling up of the selecting magnet associated with the calling register and to the pulling up of the selecting magnet associated with the memory enjoying priority, if both memories are free, or with the only memory free, if one of them is already busy.

The energization of selecting magnet C*sh*1 therefore causes the positioning of the clutch associated with the corresponding selecting bar. It will be recalled in this connection that said positioning corresponds to said memory's rotating upward, since the calling register is, as already pointed out, associated with azimuth 1.

The energization of relay CA*d* will now cause the starting of the operations involved in connecting the faulty register to the free memory through member finder C.

Through the closing of its front contact CA*d*1, relay CA*d* prepares the energizing circuit of connecting magnet CV*a*. Through the closing of its front-back contact CA*d*2, relay CA*d* completes a holding circuit for selecting magnet C*sh*14 and opens the energizing circuit of relay CA*ij*, which releases: battery, front CA*d*2, C*sh*14/1, selecting magnet C*sh*14, ground over a circuit already described.

Before proceeding with this description, the method will be explained of connecting the fault wires of the registers to the banks of the selectors of member finder C. As already pointed out, each register has 21 fault wires, referenced D*a* . . . D*u* in rectangle E. Each selector consists of fixed- and movable-contact assemblies each comprising 8 individual contacts, this requiring the use of 3 selectors for the purpose of connecting the 21 fault wires. These seletcors are shown in simplified form in Fig. 4. The fixed and movable contact springs forming part of one and the same nest bear the same characteristic figure serving to reference them. Thus the first contact assembly of the first individual selector contains the fixed and movable contacts referenced C*a*0, C*b*0 . . . C*h*0. These contacts are referenced C*a*1, C*b*1 . . . C*h*1, while the contact assembly to which they belong forms part of the second selector, etc. For each individual selector it is shown that the movable contacts belong to the first azimuth. The fixed contacts of each selector, which are multipled to the whole 28 contact assemblies making up the selector, are shown in the form of a vertical bar.

For a predetermined azimuth, the above-mentioned 21 fault wires are wired from left to right so that the first wire will be associated with the fourth contact of the assembly belonging to the first selector and the 21st to the eighth contact of the assembly belonging to the third selector. To make these explanations clear, the method will be explained of connecting the fault wires of the register bearing the number 00, which, as stated, has just taken the calling position on the banks of member finder C. The first wire (D*a*) is connected to fixed contact C*do*, the second, that is, wire D*b* (not shown), to fixed contact C*e*0, and the last, that is, wire D*u*, to fixed contact C*h*2, belonging to the third selector. Identical wiring is provided for connecting the fault wires of the other registers, associated with azimuths 2, 3 . . . 26. Of course, the above explanations hold as well for the 26 registers of the second group.

The connecting magnets of the individual registers are referenced CV*a*, CV*b* . . . CV*f*. The energization of any of these magnets causes, as is known, after the suitable positioning of the clutch, the connection of the 8 movable contacts of the contact assembly designated by the position of the clutch. Connecting magnets CV*a* . . . CV*f* are associated with the fixed and movable contacts of the selectors as follows: magnet CV*a* controls movable contacts C*a*0 . . . C*h*0, magnet CV*b* controls movable contacts Ca1 . . . Ch1, and so forth.

The first three selectors, that is, those controlled by connecting magnets CVa, CVb and CVc, are designed to connect the 26 registers of the first group. Likewise, connecting magnets CVd, CVe and CVf, associated with the next three selectors, are designed to connect the 26 registers of the second group.

It has been pointed out before that azimuths 27 and 28 of each selector are associated with the two memories that can be connected to member finder C and that priority exists in the order in which said memories can be connected to said finder. Throughout what follows, the expression "first memory" will be used to designate the memory whose seizure is given priority if both memories are free at the same time when the member finder must connect itself to one of them. One azimuth being reserved for each of the two memories, it will be assumed that azimuth 27 is reserved for the first memory. In other words, this amounts to saying that selecting magnets Csh14 and Csb14 are associated with the memories bearing the numbers 1 and 2.

According to the foregoing, the fault wires associated with a register can therefore be directed to one or the other of the two memories that can be connected to member finder C. For the purpose of directing them, provision is made to use the 27th and 28th contact assemblies associated with each individual selector. In order to make it easier to understand Fig. 4, such directing has been characterized by adding at the foot of each vertical a directing contact capable of being connected, depending upon which of the selecting magnets associated with azimuths 28 and 27 is energized, either to the control wires of the first memory, grouped in cable Y, or to the control wires of the second memory, grouped in cable Z.

It was assumed before that both memories were free at the instant the faulty register took the calling position. Owing to the priority provided for in the seizure of these memories, it was stated that selecting magnet Csh14 had energized and had thereby entailed, as will be seen in what follows, the seizure of the first memory.

It has been pointed out before that the energization of relay CAd causes the starting of the operations involved in connecting the fault wires of the calling register to one of the two memories capable of being connected to member finder C. The pulling up of relay CAd causes, as has been stated, the release of relay CAij. Owing to the closing of back contact CAi1, the energizing circuit of connecting magnet CVa is completed: battery, right-hand winding of magnet CVa, back CVa2, front CAo7, CBf8, CAd1, back CAi1, CAk1, ground.

The opening of front contact CAi2 . . . CAj6 has no effect, because selecting magnet Csh1 holds through the closing of its previously-mentioned self-holding contact. The opening of front contacts CAj7 and CAj9 likewise has no effect at the instant under consideration, selecting magnet Csh14 continuing to hold thanks to its front contact Csh14/1.

A double operation is performed due to the closing of connecting magnet CVa. It has been pointed out before that selecting magnets Csh1 and Csh14 were energized before the instant connecting magnet CVa energized. It follows from this that fault wires Da . . . De of register E are connected to control wires Ya0 . . . Ye0 of the first memory. Connecting magnet CVa completes a holding circuit for itself through the closing of its front contact CVa1: battery, right-hand winding of magnet CVa, left-hand winding of magnet CVa, front CVa1, ground on general holding wire tg.

The opening of back contact CVa2 obviously has no effect, owing to the closing of holding contact CVa1. The energizing circuit of connecting magnet CVb is completed through the closing of front contact CVa3: battery, right-hand winding of magnet CVb, back CVb2, front CVa3, ground on general holding wire tg.

Likewise, the closing of front contact CVa4 completes the energizing circuit of connecting magnet CVc: battery, right-hand winding of magnet CVc, back CVc2, front CVa4, ground on general holding wire tg.

The closing of front contact CVa5 prepares the grounding of wire c, intended to cause the bringing into calling position of the receiver and the marker that are associated with the register under consideration at the instant of the fault.

Connecting magnets CVb and CVc cause, the same way as connecting magnet CVa, the connecting of the fault wires of the register associated with them (that is, wires Yf0 . . . Ym0, associated with the individual selector that is controlled by connecting magnet CVb, and wires Yn0 . . . Yu0, associated with the individual selector that is controlled by connecting magnet CVc).

Connecting magnets CVb and CVc complete the following holding circuits for themselves through the closing of their front contacts CVb1 and CVc1:

(1) Battery, right-hand and left-hand windings of magnet CVb, front CVb1, ground on general holding wire tg.

(2) Battery, right-hand and left-hand windings of magnet CVc, front CVc1, ground on general holding wire tg.

The opening of back contacts CVb2 and CVc2 has no effect, since connecting magnets CVb and CVc have each just completed their own holding circuit.

The closing of front contacts CVb3 and CVc3 completes the grounding circuit for the previously-mentioned wire c: ground, front CVa5, CVb3, CVc3, wire c.

Wire c is connected through the closing of contact Cc0, associated with the first selector, to ringing cut-off wire b.

The role of this wire will be explained before proceeding with this description. Each register is provided with a relay EDj, whose energization tells the corresponding register that its fault wires have just been connected to the corresponding control wires of one of the two memories capable of being connected to member finder C. This relay may be regarded to a certain extent as playing a role similar to that of the ringing cut-off relays usually arranged in subscriber-line connectors. The energiztion of relay EDj causes by any suitable means the cutting off of relay EDk, whereof only contacts EDk1 and EDk2 are shown in Fig. 4.

It is known that in the course of the group- or line-selecting operations the register can be connected to a translator, to a group receiver and marker or even to a line receiver and marker. The connection of said register to the above individual members is effected through connecting members called "connectors." It follows therefore that each register must be wired to the inlets of one or more connectors designed to connect it either to the translators or to the receivers. In Fig. 4 these connectors are represented by dotted-line rectangles, referenced CT for the translator connectors and CR for the receiver connectors.

As can be seen in Fig. 4, the aforementioned ringing cut-off wire b is wired to the inlets of connectors CT and CR. To wire b therefore correspond, in the translators and the line or group receivers, the wires referenced d and e, capable of being connected to said wire b through connectors CT and CR.

It was previously assumed that at the instant the fault occurred register E was connected to a line receiver R and a line marker M. From this it follows that the receiver connector CR shown in Fig. 4 is in closed position and in particular that the wire b in the register is metallically connected to the wire e in receiver R. The ground applied to wire b through selector Cc0 is therefore extended to wire e and accordingly causes the pulling up of relay RHm in line receiver R. Each receiver is equipped with a relay RHm, the pulling up of this relay telling the corresponding receiver that the register with which it is temporarily connected has taken the calling position on the banks of a member finder and that the fault wires of said register have just been connected to the corresponding control wires of one of the two memories.

As pointed out before, it is desirable to record on the recording form the identity of a register that has just taken the calling position. The two bank contacts C*a*0 and C*b*0 of the first selector are reserved for this identification.

The two bank contacts C*a*0 and C*b*0 of the first two selectors of each 26-register group are designed to provide the discrimination of the tens and units digits of the number of a faulty register. First of all will be described the method of wiring the wipers providing the discrimination of the units digit in the number of the various registers of a group. It will be recalled that these numbers comprised between 00 and 25 are associated with the azimuths comprised between 1 and 26, inclusive, for the 26 registers of the first group. Likewise, the numbers of the 26 registers of the second group are comprised between 26 and 51 and are associated with the azimuths comprised between 1 and 26, inclusive. The 26 wipers, whereof only one, C*b*0, is shown in Fig. 4, are connected to 10 units wires such as U*a*1/0, grouped in cable U. The wiper associated with register 00, corresponding to azimuth 1, is connected to units wire U*a*0; likewise, the wiper associated with register 01, corresponding to azimuth 2, is connected to units wire U*a*1, and so forth. A similar method is used for discriminating the tens unit. To explain, the wipers associated with the registers bearing the numbers 00 . . . 09 are all connected to one and the same tens wire (D*a*0); likewise, the wipers associated with the registers bearing the numbers 10 . . . 19 are all connected to the tens wire D*a*1, and so forth. Of course, the wiring of the tens and units wipers belonging to the 26 registers of the second group is done in similar fashion. Two identification-wire groups are thus obtained, one comprising 6 wires, providing for the discrimination of the tens, and the other one 10 wires, providing for the discrimination of the units.

With each identification-wire group is associated a group of coding relays that allows sending the tens and units information in coded form to the memories of the member finder. The code employed is of a well-known type using 5 elements, which are combined 2 by 2 for each piece of information to be sent.

The table that follows will allow determining quickly the relationship between the code elements and the figures to be sent, comprised between 1 and 0.

| Code Elements | 1 | 2 | 3 | 4 | 5 | 6 | 7 | 8 | 9 | 0 |
|---|---|---|---|---|---|---|---|---|---|---|
| 1 | X | | X | | X | | | | X | |
| 2 | | X | X | | | X | | | | X |
| 3 | | | | X | X | X | X | | | |
| 4 | | | | | | | X | X | X | X |
| 5 | X | X | | X | | | | X | | |

In this table a column is associated with each piece of information to be sent, this making a total of 10 columns, representing the 10 combinations it is possible to make with the above-mentioned code. Likewise, a horizontal line has been associated with each code element, this giving 5 lines, corresponding to the 5 code elements. The result of this is that each column has 5 boxes, corresponding to the 5 elements of the sending code, whereof only 2 are used for sending the information relative to the particular column involved. The boxes corresponding to the code elements used to send any information are marked with the letter X. Thus, for example, to send the digit 2, an X has been placed in the boxes of lines 2 and 5 of column 2, which means that the sending of the digit 2 calls for the use of the 2nd and 5th elements of the code involved.

The coding of the information characterizing the units digit of the number of the registers is provided by a group of 8 coding relays referenced CG*a* . . . CG*h* in Fig. 4. The coding of the information concerning the tens unit is provided by a group of 5 coding relays referenced CE*a* . . . CE*e* in Fig. 4. With each of these relays is associated a front contact: CG*a*1 . . . CG*h*1, CE*a*1 . . . CE*e*1. These contacts are so arranged that for each piece of information received they ground two of the five wires C*a*1 . . . CA5, C*b*1 . . . C*b*5. The operation of these relays, which form a set well known and currently used in automatic telephony and remote control, will not be described in detail. Coding wires C*a*1 . . . C*a*5 and C*b*1 . . . C*b*5 are grouped into a cable C, terminating at either one or the other of the two memories capable of being connected to member finder C.

It has been pointed out before that the energization of the 3 connecting magnets CV*a*, CV*b* and CV*c* had the effect of grounding wire *c*. Relay CA*f*, whose winding is connected between this wire and battery, accordingly pulls up. The pulling up of this relay characterizes in the member finder the fact that the connection between the fault wires of the register and the control wires of the memory has become effective. Through the opening of its back contact CA*f*1, relay CA*f* breaks the energizing circuit of ringing relays CB*def* and CB*ghi*. The breaking of the energizing circuit of these relays is actually required in spite of the energization of ringing cut-off relay ED*j* in register E. In fact, whenever, as is the case in the example chosen, register E is connected to individual members, such as a receiver and a marker, the member finder cannot release and be associated with another register, since the recording of the fault wires located in the receiver and the marker has not as yet been effected. The breaking of the energizing circuit of ringing relays CB*def* and CB*ghi* thus prevents any wrong operations of the member finder in case a register had just taken the calling position at the same instant that the recording of the fault wires of the register then engaged with the member finder had just ended. The closing of front contact CA*f*2 makes it possible to render effective the grounding of the wipers C*a*0 and C*b*0 that allows identification of the calling register. General holding relay CA*ab* has its winding short-circuited by the closing of front contact CA*f*4. The other contacts of relay CA*f* are inoperative at the instant under consideration.

General holding relay CA*ab* having its energizing winding short-circuited, it does not release immediately.

It has been pointed out before that the grounding of wire *c* had entailed the energization of relay RH*m* in the line receiver engaged with the register at the instant under consideration (Fig. 5). As is known, the energization of this relay characterizes the fact that the fault wires of register E have been connected to the control wires of the memory associated with member finder C. Relay RH*m* plays a role identical with that of relay ED*k*, comprised in register E but not shown, in that it brings receiver R into calling position on the banks of the member finder. Through the closing of its front contact RH*m*1, relay RH*m* prepares the energizing circuit of common receiver ringing relay CC*d*.

Before proceeding with the detailed description of the operations involved in hunting for, identifying and connecting the calling receiver R, a description will be given of the make-up and operation of one of the two memories capable of being associated with member finder C. These two memories are further identical, in spite of the fact that priority is given to one of them whenever a common member takes the calling position on the banks of member finder C while both of said memories are free.

The make-up and the operation of the first memory will be discussed throughout what follows. This memory consists of 104 "memory" relays, shown in Fig. 8 as a single relay referenced MK*m*1/104.

With each memory are associated two seizing relays, referenced CC*abc* and CC*hij* for the first memory and CD*abc* and CD*hij* for the second. It will be recalled that at the instant of the suitable positioning of the corresponding selecting magnets, the one at the azimuth of the register chosen and the other at the azimuth of the first memory chosen, relay CA*d* pulls up. Through the closing of front contact CA*d*1, a ground has been applied to wire *mg*, thus causing the energization of connecting magnet CV*a*. Wire *mg* is extended in Fig. 5 to the energizing windings of memory-seizing relays CC*abc* and CD*abc*. It will be recalled that selecting magnet C*sh*14 is associated with the first memory and that accordingly front contact C*sh*14/3 is closed, with the result that the grounding of wire *mg* entails the energization of the first memory's seizing relay (CC*abc*): battery, front contact C*sh*14/3, winding of relay CC*abc*, wire *mg* across Figs. 5 and 4, front CA*d*1, back CA*i*1, CA*k*1, ground.

Through the opening of its back contact CC*a*1 (Fig. 5), relay CC*abc* prevents any untimely energization of selecting magnet C*sb*14. The holding circuit of selecting magnet C*sh*14 is completed through the closing of front contact CC*a*2. Relay CC*abc* completes a holding circuit for itself through the closing of its front contact CC*a*3: battery, windings in series of relays CC*hij*, CC*abc*, front CC*a*3, ground on general holding wire *tg*.

Relay CC*hij*, whose winding is connected in series with that of relay CC*abc*, pulls up.

The general holding relay MK*a* of the first memory has its energizing circuit completed through the closing of front contact CC*a*4. The closing of front contacts CC*a*5 . . . CC*a*11, CC*b*1 . . . CC*b*11, CC*c*1 . . . CC*c*11 connects part of the control wires of the memories to the corresponding "mtmory" relays. These contacts are shown in Fig. 5 as a single contact, associated with cable C and referenced CC*a*5.

It has just been pointed out that the closing of front contact CC*a*2 completed a holding circuit for selecting magnet C*sh*14. Now, it will be noticed in Fig. 3 that contact CD*a*1 is unoperated at the instant involved, because the 2nd memory is free. However, it may happen, as will be seen later on, that the time taken for sending and for recording of the information by the perforator will be considerable as compared with the time taken to record the same information at the "memory" relays. In other words, when the recording by the "memory" relays of the fault wires of the register, the receiver and the marker has ended, some time elapses between that instant and that of the full release of the corresponding memory by the perforator. In order to prevent the holding of the member finder for a relatively long dead time, provision is made to connect the member finder to the second memory while the first completes the sending to the perforator of the information it has recorded.

Relay CC*hij* "duplicates" relay CC*abc*, because the number of contacts required to connect the coding wires to the "memory" relays is large. The 29 front contacts CC*h*1 . . . CC*h*10, CC*i*1 . . . CC*i*10, CC*j*1 . . . CC*j*9 provide for the connection of the other part of the above-mentioned coding wires to the corresponding "memory" relays.

The closing of front contact MK*a*1 prepares the energizing circuit of relay MK*b* and completes the holding circuit of relay MK*a*. It will be noticed that relay MK*b* cannot pull up, its energizing winding being short-circuited through the ground over (1) front contacts MK*a*1 and (2) front contacts CC*a*4. Front contacts MK*a*3 and MK*a*4 are connected in parallel and, upon closing, prepare the general holding circuit of the "memory" relays. The connection in parallel of these contacts is made necessary due to the fact that the number of "memory" relays that can pull up simultaneously and hold over their said contacts is relatively large.

The 21 control wires Y*a*0 . . . Y*u*0 (Fig. 4) are each associated with a "memory" relay.

Reference to the table of Fig. 9 will show the wiring method used to connect fault wires Y*a*0 . . . Y*u*0 to the energizing windings of the corresponding "memory" relays. Thus, for example, it will be seen that wire Y*a*0 is connected to the winding of "memory" relay MK*m*57, wire Y*b*0 to the winding of "memory" relay MK*m*59 and wire Y*u*0 to the winding of "memory" relay MK*m*100.

Depending upon the polarities applied in register E to these various fault wires, a certain number of the above-mentioned "memory" relays pull up and complete a holding circuit for themselves through the closing of their corresponding self-holding contact. These self-holding contacts are shown as a single contact, referenced MK*m*1/1, MK*m*104/1, but actually representing the 104 holding contacts respectively associated with the 104 "memory" relays MK*m*1 . . . MK*m*104.

Coding wires C*a*1 . . . C*b*5, used to send in coded form the number of the faulty register, are connected to the corresponding "memory" relays through the above-mentioned front contacts belonging to relays CC*abc* and CC*hij*. Reference to the above-mentioned table will show the wiring method used to connect said coding wires to the corresponding "memory" relays. To explain, it will be found, for example, that coding wire C*as*1 is connected to the energizing winding of relay MK*m*6. The "memory" relays that have just pulled up to record the identity number of the faulty register complete holding circuits for themselves exactly as described before.

A description will now be given of the hunting for, the identification and the connection of the fault wires of the line receiver R associated with register E. It has been pointed out before that the connection of the fault wires of the register to the control wires of the corresponding "memory" relays was translated into the pulling up of relay CA*f*, this entailing the release of ringing relays CB*def* and CB*ghi*. Owing to the opening of their front contacts CB*d*1/10, CB*e*1/10, CB*f*1/6, CB*g*1/10, CB*h*1/10, CB*i*1/6, relays CB*def* and CB*ghi* definitively break the energizing circuit of magnet C*sh*1 and of pilot ringing relay CA*s*, which release.

The release of these relays entails the release of relay CA*d*, owing to the opening of front contact CS*h*1/2.

The release of relay CA*d* causes the release of connecting magnet C*sh*14, owing to the homing of front contact CA*d*2. It will be recalled that the opening of front contact CA*d*1 is in operative at the instant under consideration, because connecting magnets CV*a*, CV*d*, CV*c*, as well as relays CC*abc* and CC*hij*, hold over holding circuits already described. The release of selecting magnets C*sh*1 and C*sh*14 prepares the energizing circuit of relays CA*ij* and CA*k*1 owing to the homing of front-back contacts C*sh*1/1 and C*sh*14/1.

When the selecting bars have returned to normal, relay CA*d* releases again. This arrangement thus allows controlling the effective release of the selecting bars that had been used to connect the register to the first memory. It is back contact CA*d*3 that provides this control. In effect, the energization of the ringing relay of the receivers is impossible so long as relay CA*d* is pulled up. The closing of this back contact therefore completes the energizing circuit of relay CC*d*, which pulls up: battery, energizing winding of relay CC*d*, back CA*d*3, CC*f*1, front RH*m*1, ground.

Relay CC*d* tells member finder C that the faulty register with which it has just being associated is connected to a receiver whose identity will have to be determined and sends the condition of its own fault wires to a memory, this memory further being the same one used to analyze the condition of the fault wires of register E.

Through the opening of its back contact CC*d*1, receiver ringing relay CC*d* again removes the short-circuit from the energizing winding of general holding relay CA*ab*. It is known that relay CA*ab* is slow to release owing to the short-circuiting of its energizing winding. The lag provided is such that the release of this relay will not be effective the instant receiver ringing relay CC*d* pulls up. The fact that ringing relay CC*d* pulls up before the release of general holding relay CA*ab* will start in member finder C a new hunting and recording cycle, this time involving the line receiver engaged with register E.

The closing of front contact CC*d*2 prepares the energizing circuit of connecting magnet CV*g*. The closing of front contact CC*d*3 causes the grounding of wire *f* subsequently to be used for the identification of line receiver R by the energization of the corresponding pilot ringing relay.

Wire *f* (Fig. 5) is multipled to all the line and group receivers of the exchange involved. Since each receiver is equipped with a relay such as RH*m* whose front contact RH*m*2 connects the corresponding wire *f* to an identification wire I*a*, by analyzing all the wires I*a* associated either with the line receivers or with the group receivers of the exchange involved, it will be easy to learn the identity of the calling receiver. In other words, the grounding of the wire I*a* corresponding to the calling receiver amounts to bringing this receiver into calling position on the banks of member finder C.

Throughout what follows it will be assumed, by way of example, that the total number of receivers comprised in the exchange involved is 20, this number comprising 10 line receivers and 10 group receivers.

The identification wires I*a* associated with the receivers perform the same function as the corresponding wires I*a* associated with the aforementioned registers.

Proceeding in the same way as for the registers, a predetermined azimuth is associated with each receiver, be it a line or a group receiver. The first ten azimuths of individual selectors associated with the receivers are reserved for the ten line receivers. The next ten azimuths are reserved for the ten group receivers. Since there are a maximum of ten line receivers and ten group receivers for a 5000-line exchange, it is possible to use a single units-digit to number them. However, it can be arranged to use the member finder for exchanges having more than 5000 lines. In that case, the above single-digit numbering scheme becomes insufficient and requires the use of additional information characterizing the 5000-subscriber group to which the particular line or group receiver involved is connected. It follows from the foregoing comments that the identification of the line or group receivers must be done by means of numbers comprising two digits, the first of them, namely, the tens digit, being reserved to characterize the serial number of a receiver within its group (this digit being comprised, as is known, between 0 and 9), the second digit, namely, the units digit, being reserved to characterize (1) the 5000-subscriber group comprising the receiver involved and (2) the nature of said receiver, that is, to tell whether it is a line receiver or a group receiver. Throughout what follows it will be assumed that the code used for identifying the receivers is as follows:

(1) Units digit zero=line receiver belonging to the first 5000-line group.

(2) Units digit one=line receiver belonging to the second 5000-line group.

(3) Units digit two=group receiver belonging to the first group-selection stage.

(4) Units digit three=group receiver belonging to the second group-selection stage.

Within each group the selectors are numbered in ascending order from digits 0 to 9.

The method of associating the receivers with the various azimuths of the individual selector to which they are connected will now be explained with reference to the table below.

| Azimuths | Number of Receiver | Kind |
|---|---|---|
| 1 to 10 | 00, 10 . . . 90 | Line—1st 5,000-line group. |
| 11 to 20 | 02, 12 . . . 92 | Group—1st selection stage. |

This table shows only the numbers of the line or group receivers involved in the exchange under consideration, that is, the one it was assumed had only 10 line receivers and 10 group receivers to handle the traffic. By referring to this table it can easily be deduced that one line receiver, bearing the number 70, is associated with azimuth 8 and, likewise, that one group receiver, bearing the number 42, is associated with azimuth 15, for example.

The method of hunting for and connecting the calling line receiver will now be explained in the description that follows. It will be assumed that at the instant the fault occurred the calling register, bearing the number 00, was associated with a line receiver bearing the same number. Reference to the above table will show that the corresponding line receiver is associated with an odd azimuth (azimuth 1), with which is associated a selecting magnet bearing the number C*sh*1. Let it be explained in this connection that the selectors associated with the line and group receivers are mounted on the same multiselector frame as the selectors used for connecting the fault wires of calling registers to the corresponding control wires of the "memory" relays. Let it further be recalled that the identification wires I*a* associated with the line or group receivers are distributed the same way as the wires I*a* associated with the registers, that is, into 13-wire groups. Of course, since the number of wires I*a* is less than 26, the above-mentioned wire groups comprise only 10 wires each, because the total number of receivers associated with the exchange is 20. As is known, these 10-wire groups characterize the even nature of the azimuths at which the corresponding receivers are connected. These wires control pilot ringing relays CA*s* and CA*t*. Of course, pilot ringing relays CA*u* and CA*v* are not used, since the number of line and group receivers is less than 26 in the example chosen. From the preceding explanations it follows that the closing of front contact CC*d*3 completes the energizing circuit of pilot ringing relay CA*s*, which pulls up. The pulling up of this relay therefore shows in the member finder that it will be necessary subsequently to energize a selecting magnet corresponding to an azimuth.

The above-mentioned method of hunting for and connecting a receiver, which is wholly similar to the one described with reference to a faulty register, will not be described in detail. Suffice it to recall that selecting magnets C*sh*1 and C*sh*14 pull up the instant relay CA*s* does so, because the azimuth (azimuth 1) at which the calling receiver is connected is associated with selecting magnet C*sh*1 and the memory used is the same previously seized upon the connection of the fault wires of register E. However, let it be explained that, in order to prevent any possible mixups between the two memories capable of being associated with member finder C, provisions is made to lock said memories through back contacts CC*a*1 and CD*a*1 (Fig. 3). Let it be recalled that the seizing relay (CC*abc*) of the first memory has completed a holding circuit for itself through the closing of its front contact CC*a*3. From this it follows that at the instant under consideration and, besides, throughout the holding time of member finder C, back contact CC*a*1 will remain in open position. The result is that the energization of selecting magnet C*sb*14 will be prevented throughout the holding time of said finder C, because relay CD*abc*, the seizing relay of the second memory, will remain unoperated until the release of said finder C, since front contact C*sh*14/3 will remain in open position.

When the pulling up of selecting magnets C*sh*1 and C*sh*14 becomes effective, relay CA*d* pulls up again and through the closing of its front contact CA*d*1 energizes connecting magnet CV*g*, associated with the first selector serving the line and group receivers of the exchange involved.

Before proceeding with this description it is well to point out that the number of fault wires that must be connected to the corresponding wires of the "memory" relays is 8 for a line-selecting receiver and 6 for a group-selecting receiver. It has previously been shown that two digits were required to determine the identity of a receiver, whether a line or a group receiver. The determination of its identity therefore requires the use of two contacts per azimuth. Since the maximum number of fault wires to be connected is 8 (for a line-selecting receiver), it follows that it is necessary to provide for the connection of the receivers two individual selectors having, as is known, 8 contacts per assembly, this giving a total of 16 contacts per azimuth for the two selectors together but only 10 of which are used.

The identification of the wipers associated with the contact assemblies of the two selectors mentioned above is done in the same manner described with reference to the register. To explain, let it be pointed out that the wipers belonging to azimuth 1 of these two selectors are referenced C*a*6 . . . C*h*6 and C*a*7 . . . C*h*7. The connecting magnets controlling the operation of the corresponding selectors are referenced CV*g* and CV*h* in Fig. 5.

The closing of front contact CA*d*1 therefore completes the energizing circuit of connecting magnet CV*g*, which pulls up: battery, righthand winding of magnet CV*g*, back CV*g*2, frontCC*d*2, wire *mg* across Figs. 5 and 4, front CA*d*1, back CA*i*1, ground Connecting magnet CV*g* completes a holding circuit for itself through the closing of its front contact CV*g*1: battery, right- and left-hand windings of magnet CV*g* in series, front CV*g*1, ground over general holding wire *tg*.

The opening of back contact CV*g*2 has no effect at the instant under consideration, connecting magnet CV*g* having completed a holding circuit for itself through the closing of its front contact CV*g*1.

The energizing circuit of connecting magnet CV*h* is completed through the closing of front contact CV*g*3: battery, right-hand winding of selecting magnet CV*h*, back CV*h*2, front CV*g*3, ground over general holding wire *tg*.

The closing of front contact CV*g*4 prepares the energizing circuit of relay CC*f*. The pulling up of magnet CV*g* causes the connection of wipers C*a*6 . . . C*h*6 associated with the corresponding selector.

Connecting magnet CV*h* completes a holding circuit for itself through the closing of its front contact CV*h*1: battery, right- and left-hand windings of magnet CV*h* in series, front CV*h*1, ground over general holding wire *tg*.

The opening of back contact CV*h*2 produces no effect at the instant involved, because connecting magnet CV*h* holds through the closing of its above-mentioned front contact CV*h*1.

The closing of front contact CV*h*3 has the effect of grounding the two verticals corresponding to wipers C*a*6 and C*b*6.

The closing of front contact CV*h*4 completes the energizing circuit of relay CC*f*, which pulls up: battery, relay CC*f*, front CV*h*4 and CV*g*4, ground.

The energizing winding of relay CA*ab* is short-circuited through the closing of front contact CV*h*5.

The grounding of wipers C*a*6 and C*b*6 entails the operation of coding relays CF*a* . . . CF*h*, CI*a* . . . CI*e*. These coding relays form coding pyramids similar to those previously mentioned in connection with the registers. The first of these pyramids, that is, the one comprising coding relays CF*a* . . . CF*h*, is used to send in coded form to code wires C*c*1 . . . C*c*5 the information concerning the tens digit in the number of the receiver engaged with the register at the instant the fault occurs. Likewise, coding relays CI*a* . . . CI*e*, forming the second pyramid, are used to send in coded form to code wires C*d*1 . . . C*d*5 the information concerning the units digit in the number of the receiver engaged with the register at the instant the fault occurs. The wiring method used to connect wipers C*a*6 and C*b*6 to identification wires C*c*1/5 and C*d*1/5 will not be described, the method used being identical with the one described with reference to register E.

When the pulling up of magnets CV*g* and CV*h* becomes effective, continuity is ensured between the fault wires (R*a* . . . R*h*) of line receiver R and the control wires (Y*a* . . . Y*h*1) of the first memory then engaged with member finder C. Reference to the table of Fig. 9 will show the method used to connect control wires Y*a*1 . . . Y*h*1 and code wires C*c*1/5 and C*d*1/5 to "memory" relays MK*m*1/104.

It was pointed out before that the closing of front contact CV*h*5 had caused the short-circuiting of the energizing winding of general holding relay CA*ab*. As is known, this relay does not release immediately and this lag is used to bring into calling position the other individual members capable of being connected to register E at the instant of the fault.

It is recalled that these individual members are a line receiver and a line marker. The recording of the fault wires of the line receiver having just been effected, the member finder will therefore now proceed to hunt for the line marker engaged with the register. It has been pointed out before that the grounding of wire *c* (Fig. 4) causes in receiver R and in marker M the energization of ringing relays RH*m* and MM*u*. However, the pulling up of ringing relay MM*u*, associated with line marker M, had no effect, because magnets CV*g* and CV*h*, being not yet energized, had their front contacts CV*h*4 and CV*g*4 in "open" position and consequently relay CC*f* remained unoperated. On the other hand, when the connection of the fault wires of receiver R becomes effective, the pulling up of the pilot ringing relay (CC*e*) of the markers can become effective, owing to the energization of relay CC*f*.

Relay CC*f* is designed to control the connection of the fault wires of receiver R to the corresponding control wires of the "memory" relays of the first memory. The pulling up of relay CC*f* will now start (1) the release of the selecting bars previously engaged to connect the receiver and (2) the positioning of the selecting bars that must be used to connect line marker M.

Through the opening of its front contact CC*f*1, relay CC*f* breaks the energizing circuit of relay CC*d*, which releases. Through the closing of its front contact CC*f*2, relay CC*f* prepares the energizing circuit of the pilot ringing relay (CC*e*) of the markers. The ground applied to wire *f*, serving to identify the calling receiver, is removed through the opening of back contact CC*f*3.

The release of relay CC*d* has no effect at the instant involved.

The removal of the ground from wire *f* causes the release of selecting magnet C*sh*1, which had been used before to connect line receiver R. This release entails the opening of front contact C*sh*1/2, the effect of this being to break the energizing circuit of relay CA*d*, which releases.

Selecting magnet C*sh*1 is released at the same instant as pilot ringing relay CA*s*. The release of relay CA*s* causes, among other things, the opening of its front contact CA*s*1, the effect of this being to prevent any untimely energization of relay Ca*ij* upon the release of relay CA*d*.

The release of relay CA*d* causes the opening of its front contact CA*d*1, the effect of this being to remove the ground applied to wire *mg*, thus preventing any untimely energization of a connecting magnet before the corresponding selecting bar is placed in a suitable position.

The opening of back contact CA*d*2 breaks the energizing circuit of selecting magnet C*sh*14, associated with the first memory engaged with member finder C.

Through the closing of its back contact CA*d*4, relay CA*d* completes the energizing circuit of marker ringing relay CC*e*: battery, relay CC*e*, front CC*f*2, back CA*d*4, wire *r*, front MM*u*1, ground.

It will be noticed that, the same way as previously described with reference to the connection of a receiver R, the pulling up of the marker ringing relay is effected after having controlled the release of the selecting bars previously engaged, this control being effected by back contact CA*d*4 of relay CA*d*.

The pulling up of marker ringing relay CC*e* will start the cycle of operations involved in hunting for and connecting the calling line's marker (M). General holding relay CA*ab*, whose energizing winding was previously short-circuited through the closing of front contact CV*h*5, has not yet released when marker ringing relay CC*e* pulls up. The fact the general holding relay CA*ab* has not yet released its armature when relay CC*e* pulls up, means that register E, which had previously been brought into calling position on the banks of member finder C, is associated (1) with a receiver and (2) with a marker, this requiring the starting of the operations of hunting for and recording the fault wires of said marker M.

Through the opening of its back contact CC*e*1, relay CCe removes the short-circuit from the energizing winding of general holding relay CA*ab*. Through the closing of front contact CC*e*2, a ground is applied to wire *p* to cause the energization of the pilot ringing relay associated with the calling-line marker and of the selecting magnet that is to control the positioning of the corresponding selecting bar at the azimuth of the marker involved. Relay CC*e* completes a holding circuit for itself through the closing of its front contact CC*e*3: battery, relay CC*e*, front CC*f*2, CC*e*3, wire *r*, front MM*u*1 associated with calling marker M, ground.

The energizing circuit of connecting magnet CV*i* is prepared through the closing of front contact CC*e*4.

Before proceeding with this detailed description of the connection of the fault wires of the calling marker to the corresponding control wires of the "memory" relays, the method will be described as associating the line and group markers of the exchange involved with the corresponding azimuths of the individual selectors of member finder C.

It will be assumed, by way of example, that the exchange involved comprises, for the normal handling of its traffic, a set of 26 markers comprising 20 line and 6 group markers. It will be recalled in this connection that the line or group markers are permanently associated with line-selecting anl group-selecting means. Generally two markers are allotted to each line-selecting or group-selecting means. Thus, the above 20 line markers are associated with 20 line-selecting sets. Likewise, the 6 group markers are associated with 3 group-selecting means. It will further be recalled that the capacity of a line-selecting means is 500 subscribers. It follows, therefore, that the 10 line-selecting means mentioned above represent a total capacity of 5000 subscribers.

Within each line-selecting means the associated markers will be referenced marker 1 and marker 2. From this it follows that, in order to determine the full identity of a marker, it is necessary to have the following information:

(1) The 1000 group by which the called subscriber is served.

(2) Within that 1000 group, the identity of the 500 group by which the called subscriber is served. According to the foregoing, two line-selecting means are associated with each 1000 group.

(3) Within a line-selecting means, the number of the marker (marker 1 or marker 2).

These explanations will now allow explaining the method of associating the line markers with the corresponding azimuths of the selectors that are to connect their fault wires to the control wires of the corresponding "memory" relays.

The markers are grouped in the ascending order of the 1000's. Within each 1000, the numbers of the line-selecting means themselves are grouped in ascending order. Likewise, within a line-selecting means, the two markers mentioned above are grouped in the following order: marker 1 and marker 2. From this it follows that each 1000 has four azimuths at which are associated the four markers serving the two line-selecting means making up the corresponding 1000. To explain, with azimuth 1 is associated the first marker of the first line-selecting means serving the first 1000. Likewise, with azimuth 2 is associated the second marker serving the first line-selecting means of the first 1000, and so forth.

To complete these explanations reference will be made to the table below, giving, for the whole exchange, the association of the 20 azimuths with the corresponding 20 line markers.

| Azimuth | Marker Number | 1000's Number | Line-Selecting Means Number |
|---|---|---|---|
| 1 | 1 | 0 | 0 |
| 2 | 2 | 0 | 0 |
| 3 | 1 | 0 | 1 |
| 4 | 2 | 0 | 1 |
| -------- | -------- | -------- | -------- |
| -------- | -------- | -------- | -------- |
| 17 | 1 | 4 | 0 |
| 18 | 2 | 4 | 0 |
| 19 | 1 | 4 | 1 |
| 20 | 2 | 4 | 1 |

The method of associating the azimuths of the selectors with the corresponding group markers will now be described in identical fashion. It is necessary to determine two elements in order to learn the full identity of a group marker:

(1) The identity of the group-selecting means with which the marker involved is associated.

(2) The serial number of the marker in the group-selecting means. In harmony with the line markers, the two markers associated with a group-selecting means will be designated "marker 1" and "marker 2."

The corresponding 6 azimuths are associated with the 6 group markers in the ascending order of the corresponding serial numbers of the group-selecting means and the corresponding serial numbers of the group markers in said group-selecting means.

The table below shows the relationship existing between (1) the azimuths of the individual selectors associated with the group markers and the serial numbers of the group-selecting means and (2) the serial numbers of the group markers in said group-selecting means.

| Azimuth | Group-Selecting Means Number | Group Marker Number |
|---|---|---|
| 21 | 0 | 1 |
| 22 | 0 | 2 |
| 23 | 1 | 1 |
| 24 | 1 | 2 |
| 25 | 2 | 1 |
| 26 | 2 | 2 |

The detailed description will now be resumed of the operations leading to the connection of the fault wires of line marker M to the corresponding control wires of the "memory" relays of the first memory. It will be assumed by way of example that at the instant of the fault the register is associated with a line marker forming part of the first line-selecting means serving the first 1000-subscriber group of the exchange involved. It will further be assumed that in that line-selecting means the marker associated with the register bears the number 1. Reference to a previously-mentioned table will show that the marker M here involved is connected at azimuth 1 of the individual selectors that must make the connection of said marker to the corresponding "memory" relays.

An identification wire *s* is associated with each marker such as M. For the exchange involved, there are therefore a total of 26 wires *s*, which can be divided into two groups, one comprising 20 wires associated with the 20 line markers and the other one 6 wires associated with the 6 group markers. These wires are grouped into cable I, previously mentioned and terminating, as is known, (1) at pilot ringing relays CA*s*—CA*t* and (2) at selecting magnets C*sb*1 . . . C*sh*13. The method of associating these wires with the corresponding selecting magnets will not be described again. But it will be recalled, by way of example, that the wire *s* associated with the marker corresponding to azimuth 1 controls selecting magnet C*sh*1 and that the wire *s* associated with the marker corresponding to azimuth 26 controls selecting magnet C*sb*13.

It follows from the foregoing that the marker associated with register E must cause through its wire *s* the energization of pilot ringing relay CA*s*. The energization of this relay is in fact determined by the closing of front contact CC*e*2, which grounds wire *p*. As examination of Fig. 6 will show, this wire *p* is multipled to all the 26 front contacts MM*u*2 associated with the 26 line and group markers. As is known, the energization of relay CA*s* entails, through the closing of its front contact CA*s*1, the energization of relay C*aI*, which itself causes, through the closing of its front contact C*ai*1, the energization of selecting magnet C*sh*1, associated with the azimuth 1 corresponding to the line marker associated with the faulty register. Further, selecting magnet C*sh*14, associated with the first memory, pulls up in accordance with a method already described.

When the energization of selecting magnets C*sh*1 and C*sb*14 becomes effective, or, what amounts to the same, when the selecting bars and the corresponding clutches are in suitable position, relay CA*d* pulls up again, owing to the closing of front contacts C*sh*1/2 and C*sh*14/2.

Relay CA*ij*, associated with the first memory, releases again, owing to the placing in operation position of front-back contact CA*d*2. It follows from this that the energizing circuit of connecting magnet CV*i* is completed over the following circuit: battery, right-hand winding of magnet CV*i*, back CV*i*2, front CC*e*4, wire *mg* across Figs. 6, 5 and 4, front CA*d*1, back CA*i*1, CA*k*1, ground.

Selecting magnet CV*i* is associated with the individual selector whose wipers are referenced C*a*8, C*h*8 in Fig. 6. As examination of that figure will show, this selector is associated with the line and group markers to connect their fault wires to the control wires of the corresponding "memory" relays. However, since the number of fault wires of the line and the group markers is 10 and 8, respectively, it follows that it is necessary, in order to connect all the fault wires associated either with a line or with a group marker, to provide two individual selectors per azimuth or, what amounts to the same, per marker. The second individual selector in question has its wipers referenced C*a*9 . . . C*h*9 in Fig. 6 and is associated with connecting magnet CV*j*. Connecting magnet CV*i* completes a holding circuit for itself through the closing of its front contact CV*i*1: battery, right- and left-hand windings of magnet CV*i* in series, front CV*i*1, ground on general holding wire *tg*.

The opening of back contact CV*i*2 has no effect at the instant under consideration, connecting magnet CV*i* having just completed a holding circuit for itself through the closing of its front contact CV*i*1. The closing of front contact CV*i*3 completes the energizing circuit of connecting magnet CV*j*, which pulls up: battery, right-hand winding of magnet CV*j*, back CV*j*2, front CV*i*3, ground on general holding wire *tg*.

Ground is applied to wipers C*a*8, C*b*8 through the closing of front contact CV*i*4. A ground is applied to wire *t* to tell the perforator subsequently that it must record the fault wires belonging to a marker.

Connecting magnet CV*j* connects wipers C*a*9 . . . C*h*9. Through the closing of its front contact CV*j*1 it completes a holding circuit for itself over the following circuit: battery, right- and left-hand windings of magnet CV*j* in series, front CV*j*1, ground on general holding wire *tg*.

The opening of back contact CV*j*2 has no effect at the instant under consideration, connecting magnet CV*j* having just completed a holding circuit for itself through the closing of its front contact CV*j*1. Through the closing of front contacts CV*j*3, CV*j*4, CV*j*5, grounds are sent over wires *x*1, *y*1, *z*1 to allow identification of the fifties-selector frame, the final-selector frame and the overflow split frame engaged at the instant of the fault. Finally, the energizing winding of general holding relay CA*ab* is short-circuited through the closing of front contact CV*j*6 to cause the subsequent release of member finder C.

It will be recalled that the line and the group markers have 10 and 8 fault wires, respectively. These wires are referenced S*a* . . . S*h*/S*j* in Fig. 6.

This showing has been used to allow showing at the same time the 10 wires S*a* . . . S*j* associated with a line marker or the 8 wires S*a* . . . S*h* associated with a group marker.

The energization of connecting magnets CV*i* and CV*j* causes the operation of the corresponding selectors, this having the effect of connecting the 10 fault wires S*a* . . . S*j* of line marker M to the control wires Y*a*2 . . . Y*j*2 of the corresponding "memory" relays.

It has just been pointed out that the closing of front contacts CV*j*3, CV*j*4, CV*j*5 had the effect of grounding wires *x*1, *y*1, *z*1. The use of these wires, whose function, as has been pointed out, is to allow identification, if need be, of a fifties-selector frame, a final-selector frame or, finally, an overflow split frame, will be described in what follows.

It is known that in the course of the line-selecting operations the seized line marker controls the routing of the call from the line-selecting means by marking in succession (1) a fifties selector and (2) a final selector. It will be recalled that in a telephone system using crossbar switches, such as the system to which reference has been made in this description, the subscribers are grouped by fifties, the association of ten fifties constituting what is called a line-selecting means having capacity for 500 subscribers.

Whenever in the course of putting through a call, and more particularly in the course of the line-selecting operations, the register reveals that the time taken to perform such an operation is abnormally long, it is not necessarily the fault either of the seized common member (register) or of the individual members associated therewith, that is, the line receiver and the line marker, in the example here chosen. The putting through of the call is indeed dependent on the proper operation not alone of the common and the individual members but also of the selector frames that normally must be used for putting through said call. Thus it is, for example, that an abnormally-long holding time of the marker does not necessarily mean that the marker involved is faulty but that the selector frames to which it is connected may themselves not be operating properly. In the case of the line selection, line marker M is associated, as is known, (1) with a fifties-selector frame and (2) with a final-selector frame. Further, if all the fifties selectors of a split having access to the final selector by which the subscriber is served are busy, the call can still be put through by using an overflow selector giving access to some other fifties-selector split having access to the final selector by which the above-mentioned subscriber is served. It is therefore important that in the course of the operations involved in recording the fault wires of a line marker there be identification of the fifties-selector frames, final-selector frames and overflow-selector frames engaged with the marker at the instant the fault occurs.

An identification contact has been provided in each of the above-mentioned frames. These contacts are referenced *t*1, *t*2, *t*3 in Fig. 6, being respectively the identification contacts of the fifties-selector, final-selector and overflow-selector frames. The method of identification is similar to the one described with reference to the identification of register E, for example.

It will be assumed throughout what follows that each line-selecting means comprises 4 fifties-selector splits. Likewise, it will be assumed that there are also four splits of three first-selector frames each in each group-selecting means. From this it follows that each marker can have access either to 12 fifties selectors, in the case of a line-selecting means, or to 12 first selectors, in the case of a group-selecting means.

As reference to Fig. 6 will show, each wire *x*1 belonging to a predetermined marker (be it a line or a group marker) is multipled to 12 identification contacts *t*2 corresponding either to the 12 fifties-selector frames or to the 12 first-selector frames. Each contact *t*2 has an identification wire. These wires are referenced G0/11 for the whole 12 fifties or first selectors of a line- or a group-selecting means. It was pointed out before that the total number of markers associated with a 5000-line exchange was 26, namely, 20 line markers and 6 group markers. Since each marker has one wiper, such as C*c*8, 26 wires *x*1 are associated with each selector. Since each marker will always have access to twelve quite-definite fifties-selector frames, in order to determine the full identity of a fifties-selector frame it suffices to know simply the serial number of this frame in the line-selecting means to which it is connected. As pointed out before, the identity of this line-selecting means is recorded, for it allows determining the identity of the marker engaged with the register at the instant of the fault. In other words, the fifties-selector or the first-selector frames can have similar identification numbers in the various line-selecting or group-selecting means, because the identity of the corresponding line-selecting or group-selecting means allows learning the full identity of the corresponding markers. Thus, 12 identification wires G0 . . . G11 are sufficient to provide identification of all the fifties-selector or first-selector frames of the exchange involved. Stated otherwise, in the cable referenced G0/11, H0/9, I0/3, each group of 12 wires G0/11, H0/9, I0/3 is multipled on its own to the whole 26 corresponding wipers, namely, C*c*8, C*d*8, C*e*8.

Also, it will be assumed that a line or a group marker can have access either to 10 final selectors or to 10 second selectors; accordingly, the identification wire *y*1 associated with a predetermined marker is multipled to the whole 10 contacts *t*1 corresponding either to the 10 final selectors or to the 10 second selectors associated with the corresponding line-selecting or group-selecting means.

Finally, each line marker can have access to 4 overflow-selector frames, this requiring, as reference to the figure will show, the multipling of wire *z*1 to the whole 4 identification contacts *t*3, each belonging to a predetermined overflow-selector frame.

Identification wires G0/11, H0/9, I0/3 have access respectively to three coding-relay groups CL*a*/*i*, CJ*a*/*h* and CH*g*/*i*. The operation of these coding pyramids will not be described, having already been explained. However, it is well to point out, with reference to the sending in coded form of the information relative to the identification number of the finders, the fifties selectors or the first-selector frames, that the numbers to be sent are comprised between 0 and 11, this corresponding to 12 different signals. Since with the code previously used it is possible to send only 10 different signals, an additional coding relay (CL*i*) has been provided, charged with sending, if needed, through the closing of its front contact CL*i*1, a ground over additional coding wire C*e*6. As will be seen later on, wire C*e*6 allows direct control of the perforator's punching for the previously-mentioned line 11. At the same time that this additional punching is done, the units digit is sent in code the same way as before. To explain, if the number to be sent is 11, for example, the digit 1 is sent in the standard coded form (ground on wires C*e*1, C*e*5) and wire C*e*6 is grounded. As will be seen later on, this results in the punching of two holes in the proper column of the recording form, one hole as a result of the sending of the code for digit 1 and one hole representing the grounding of wire C*e*6, this hole, as is known, being made on line 11. It is possible in this way to send 20 different perforations by punching an additional hole. By also using a perforation on line 12 of the recording form, it is possible to send 20 different indications per column.

The method of identifying the markers will now be explained. As pointed out before, the line markers are grouped (1) in the ascending order of the serial numbers of the line-selecting means and (2) in the ascending order of the 1000's to which the ten line-selecting means are connected. It will further be recalled that in the line-selecting means the two associated markers are each assigned a number and are grouped in the following order: marker 1, marker 2.

Four relays, referenced CH*a*, CH*d*, CH*e*, CH*f* and operating as follows, are provided for identification of the markers. Relay CH*d* and CH*e* are designed to identify the two markers associated either with a line-selecting or with a group-selecting means. The method of associating the markers with the corresponding relays is as follows:

(1) Relay CH*d*=marker 1 in the first or second 500-line group.

(2) Relay CH*e*=marker 2 in the first or second 500-line group.

(3) Relay CH*a*=first 500-line group.

(4) Relay CH*f*=second 500-line group.

Figs. 6 and 7 do not show in detail the method of connecting the wipers associated with the line and group markers to the corresponding identification relays. These wiring methods can be very easily deduced from the foregoing explanations; for example, the marker associated with azimuth 1 forms part, as is known, of the first 500-subscriber group and bears the number 1 in said group, its corresponding identification wiper, namely, wiper C*b*8, being connected, by means of wire S*a* through cable S, to the left-hand winding of relay CH*d*. Likewise, the wiper corresponding to azimuth 2 is connected by means of wire S*b* to the left-hand winding of relay CH*e*, and so forth. Relays CH*d* and CH*e* energize in series with relays CH*a* and CH*f*, with the result that, for each wiper whose connection becomes effective owing to the operation of the corresponding selector, two identification relays pull up. The method just explained applies as well to the line and the group markers.

As regards a line marker, it is necessary to give in addition the serial number of the 1000's to which it is connected or, more exactly, to which is connected the line-selecting means with which it is associated. Identification of the 1000's is done through wipers C*a*8, which can be associated through wires S0/4 with identification relays CE*f* . . . CE*i*. The wiring method used is as follows. The first four azimuths, which, as is known, are assigned to the first 1000's, have their corresponding wipers C*a*8 connected by means of wire S0, through cable S, to the energizing winding of coding relay CE*i*. Likewise, the next four azimuths are connected electrically to the energizing winding of coding relay CE*j* by means of wire S1, and so forth. The coded information concerning the identity of the fifties-selector, final-selector and overflow-selector frames, as well as the information concerning the identity of the marker seized, is sent through cable C to the corresponding "memory" relays.

At present, the "memory" relays of the first memory have therefore just recorded the identity of the marker associated with register E, the condition of its fault wires S*a* . . . S*j* and the identity of the various above-mentioned selector frames with which it was engaged.

It was pointed out before that the energizing winding of general holding relay CA*ab* was short-circuited owing to the closing of front contact CV*j*6 associated with connecting magnet CV*j*. At present, the recording of the fault wires of the various individual members engaged with register E, namely, receiver R and marker M, has therefore just become effective. Since there are no other individual members capable of being engaged with the register, the release of the member finder will therefore be able to take place through the slow release of general holding relay CA*ab*. It is known that holding relay CA*ab* releases with a certain lag, due to the short-circuiting of its energizing winding.

Through the opening of its front contact CA*b*2, holding relay CA*ab* removes the ground from general holding wire *tg*, this bringing about the release of all the connecting magnets CV*a* . . . CV*j*. Relay CC*f*, having its energizing winding broken owing to the opening of front contacts CV*g*4 and CV*h*4, releases, this entailing the release of marker ringing relay CC*e*. Through the opening of its front contact CC*e*2, relay CC*e* removes the ground from identification wire *p*, this entailing the release of selecting magnet C*sh*1 and of relay CA*d* owing to the opening of front contact C*sh*1/2. This relay in turn causes the release of connecting magnet C*sh*14 owing to the return to normal of front-back contact CA*d*2.

Further, the removal of the ground from general holding wire *tg* causes the release of relays CC*abc* and CC*hij*, which served (1) to seize the first memory and (2) to provide metallic continuity between code wires C*a*1 . . . C16 through the closing of their front contacts referenced CC*a*5 . . . CC*j*9 in Fig. 5. The opening of said front contacts has no effect at the instant under consideration, since the "memory" relays hold over their respective holding contact, as has already been pointed out.

The opening of front contact CC*a*4 removes the ground from wire *m*, this entailing the pulling up of relay MK*b*, while relay MK*a* holds in series with said relay MK*b*: battery, relay MK*a*, back MK*d*2, relay MK*b*, front MK*a*1, ground.

The pulling up of relay MK*b* entails the pulling up of the busying relay (MK*e*) of the first memory, owing to the closing of front contact MK*b*1: battery, relay MK*e*, front MK*b*1, ground.

It will be assumed in what follows that only one perforator is provided to record information concerning the various faults likely to develop in the common and individual members of the exchange. Since there are two memories capable of being connected to said perforator, a connector K is provided to connect said memories to perforator P. A test relay in connector K is associated with each memory. These relays are referenced KC*t* and KC*t'* in Fig. 8 and they are respectively associated with the first and the second memory.

Figure 8:
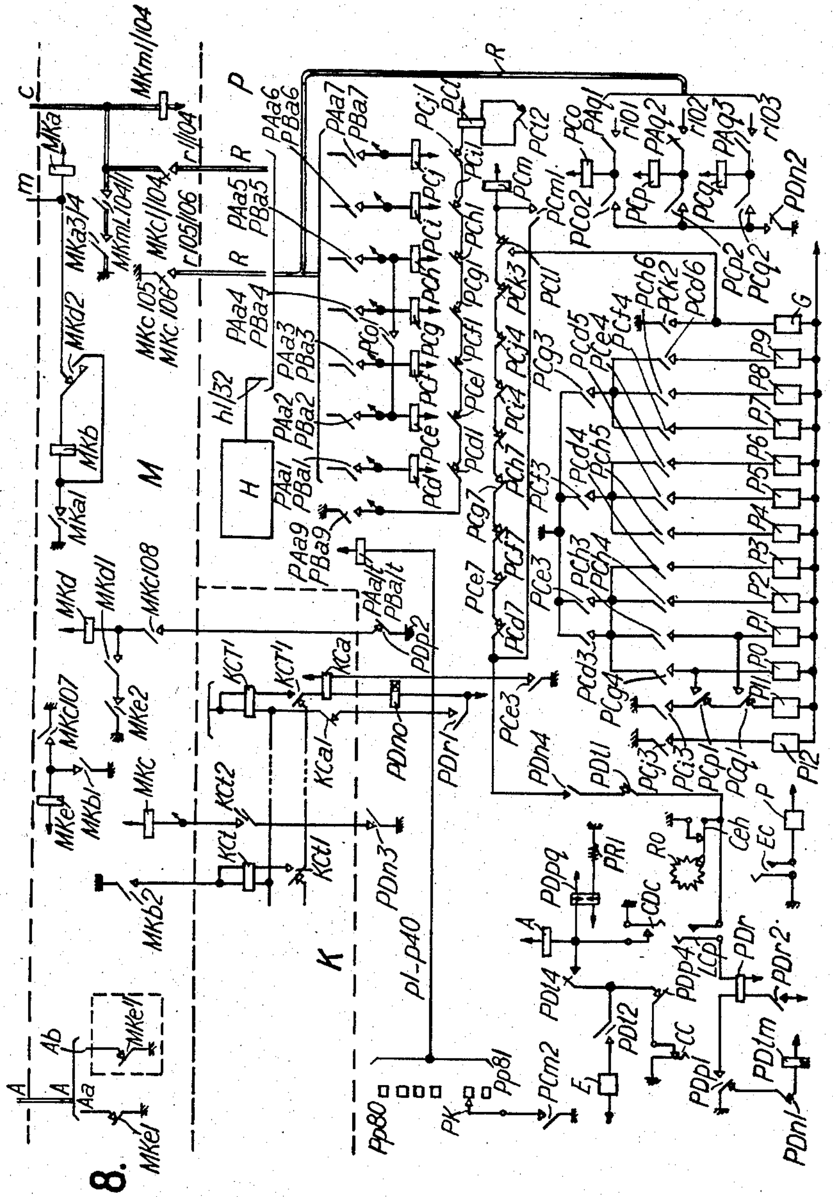

With each test relay KC*t* and KC*t'* is associated a front contact MK*b*2, only one of which, the one belonging to the first memory, is shown in Fig. 8. The closing of this contact brings the first memory into calling position on the banks of connector K. Relay KC*t* therefore pulls up: battery, front PD*r*1, back KC*a*1, left-hand winding of relay KC*t*, front MK*b*2, ground.

It is well to explain that front contact PD*r*1 is closed, because relay PD*r*, with which it is associated, shows the availability of the perforator and characterizes its availability by pulling up.

The energization of test relay KC*t* tells perforator P that the calling memory is memory 1. Relay KC*t* and KC*t'* form a relay chain whose operation is well known.

Relay KC*t* completes a holding circuit for itself through the closing of its front contact KC*t*1, which further entails the energization of relays KC*a* and PD*no*: battery, windings of relays PD*no* and KC*a* in series, back KC*t'*1, front KC*t*1, right-hand winding of relay K, ground over a circuit already described.

Through the closing of its front contact KC*t*2, relay KC*t* prepares the energizing circuit of relay MK*c*. The energization of relay MK*e* busies the first memory, through the opening of back contact MK*e*1. It will be recalled in this connection that the availability of the memories is characterized by the presence of ground on wires A*a* and A*b* (Fig. 8). The closing of front contact MK*e*2 prepares a holding circuit for relay MK*d*.

Perforator P forms no part of the invention but it is of a type currently used in mechanical recording. To understand the specification it is nevertheless necessary to describe its members, enclosed in a dotted-line box referenced P in Fig. 8. The perforator comprises 12 punches, intended to make perforations on lines 0 . . . 12 of the recording forms. The control of the punches is effected in two cycles. With each of them is associated a clutch, controlled by an auxiliary magnet. Stated otherwise, there are as many auxiliary magnets as there are punches to be controlled. The energization of an auxiliary relay places the corresponding clutch in operating position, without however causing the operation of the punch. The operation of the corresponding punch is then caused by energizing a magnet, a so-called "perforating" magnet, common to all the punches. This arrangement therefore allows causing the operation of one or more punches simply by energizing that magnet, the operation depending on whether the auxiliary magnets of the corresponding punches are energized or not.

The recording form is moved by a carriage bearing a brush P*k* that moves in front of 80 stationary position terminals and that accordingly can open or close 80 different electrical circuits. There is a specific column in the recording form for each terminal. These terminals are referenced P*p*1 . . . P*p*80 in Fig. 8.

It was pointed out before that 40 columns in the recording form were sufficient to record all the faults likely to affect either the common or the individual members of the exchange involved. Therefore, the above-mentioned identification terminals can be multipled two by two. The 80 identification terminals are thus actually associated, in this particular embodiment, with 40 electrical circuits, the multipling having been so done that terminal 1 will be connected to terminal 41, terminal 2 to terminal 42 and, finally, terminal 40 to terminal 80. With each 2-terminal group is associated a so-called "column" relay, whose role will be explained later. These relays, 40 in number, are referenced PA*a* . . . PA*t*, PB*a* . . . PB*t* in Fig. 8 but they are shown as a single relay, referenced PA*a/t*, PB*a/t*. These relays are connected in the order PA*a* . . . PA*t*, PB*a* . . . PB*t* to the 40 pairs of position terminals 1 and 41 . . . 20 and 60, 21 and 61 . . . 40 and 80 by means of the 40 position wires *p*1 . . . *p*20, *p*21 . . . *p*40 associated with the energizing windings of the corresponding 40 column relays.

It was pointed out before that the energization of relay KC*t* had entailed the energization of relay PD*no* owing to the closing of front contact KC*t*1. Relay PD*no* characterizes the seizure of the perforator. Through the closing of its front contact PD*n*2, relay PD*no* prepares a holding circuit for relays PC*o*, PC*p*, PC*q*. The energizing circuit of memory-connecting relay MK*c* is completed through the closing of front contact PD*n*3: battery, relay MK*c*, front KC*t*2, PD*n*3, ground.

The energizing circuit of column-relay controlling relay PC*m* is completed through the closing of front contact PD*n*4: battery, relay PC*m*, back PC*l*1, PC*k*3, PC*j*4, PC*i*4, PC*h*7, PC*g*7, PC*f*7, PC*e*7, PC*d*7, front PD*n*4, back PD*l*1, back C*eh*, ground.

Contact C*eh* is a contact charged with controlling the step-by-step advance of the recording form. This step-by-step advance is actually provided by a ratchet wheel that occupies such a position that the pawl at the end of contact C*eh* falls into the space between two teeth of said ratchet wheel when the recording form is stopped in a position corresponding to the punching of a predetermined column.

Relay KM*c* is intended to connect "memory" relays MK*m*–1/104 to perforator P. In view of the large number of wires that must be connected, namely, 104 in the example chosen, a single relay is obviously insufficient. Therefore, relay MK*c* actually consists of a certain number of independent relays, whose windings are all connected in parallel and whose front contacts are suitably distributed in order to connect the above-mentioned 104 wires. To simplify, relays MK*c* are shown as a single relay in Fig. 8. The multipling arrow immediately below the lower outlet of the energizing winding of relay MK*c* charactertizes the fact that relay MK*c* actually consists of a certain number of elementary relays all operating at the same time and all performing the same function. The 104 front contacts used to connect the 104 "memory" relays MK*m*1/104 to the perforator's 104 control wires *r*1/104 are shown as a single front contact MK*c*1/104 in Fig. 8.

The closing of front contact MK*c*107 completes a holding circuit for the first memory's busying relay MK*e*: battery, relay MK*e*, front MK*c*107, ground.

Relay PC*m* completes a holding circuit for itself through the closing of its front contact PC*m*1: battery, relay PC*m*, front PC*m*1, ground over a circuit already described.

Through the closing of front contact PC*m*2, a ground is applied to carriage brush P*k*: ground, front PC*m*2, brush P*k*.

Seven decoding relays, referenced PC*d* . . . PC*j* in Fig. 8, are provided to decode the information received by the perforator. These relays are intended to control, over their corresponding contacts, the auxiliary clutch magnets of the above-discussed punch magnets. These punch magnets are referenced P0 . . . P12 in Fig. 8.

To punch a hole in a recording form it is necessary to know two things: (1) the number of the column and (2) the number of the line at whose intersection the hole must be punched. The punching of a hole on any of the lines 0 . . . 9 requires the energization of two of the decoding magnets PC*d* . . . PC*h*. These magnets correspond to the first five elements of the information-sending code mentioned before with reference to the coding of the identity number of the faulty register and of the individual members associated with it. For example, if it is desired to punch a hole on line 2, it is known from a previously-mentioned table that the sending of the digit 2 in coded form requires the use of elements 2 and 5 of the code. Decoding relays PC*e* and PC*h* correspond to these elements.

Through the closing of their front contacts PE*e*3 and PC*h*4, decoding relays PC*e* and PC*h* control, as shown, punch magnet P2 (not taking into account the energization of relay PC*m*). The control of all the punch magnets, P0 . . . P9, is effected the same way just described with reference to the control of punch magnet P2. To punch a hole it is necessary not alone to control the corresponding punch magnet but to take into account the position occupied by the recording form before energizing the above-mentioned perforating magnet.

The control of decoding relays PC*d* . . . PC*j* must therefore depend on the position occupied by the recording form. This control is provided by the 40 column relays PA*a*/*t*, PB*a*/*t* mentioned before. For each position occupied by the recording form, brush P*k* takes a specific position in front of identification terminals P*p*1 . . . P*p*80. For each position taken by brush P*k*, one of the 40 column relays mentioned above is energized. Thus, for example, reference to Fig. 8 will show that if the recording form occupies the position corresponding to the punching of its first column, brush P*k* takes the position corresponding to terminal P*p*1 and thereby closes the energizing circuit of column relay PA*a*, which then pulls up. In proportion as the recording form advances in the machine, column relays PA*a*/*t*, PB*a*/*t* pull up in succession and in the order PA*a*, PB*b* . . . PA*t*, PB*a*, PB*b* . . . PB*t*.

It was pointed out before that in order to provide the control of an auxiliary punch magnet, it was necessary to control the pulling up of two of the five decoding relays PC*d* . . . PC*h*.

When perforations must be made on additional lines 11 and 12 of the recording form, the corresponding punch magnets are controlled through the two additional decoding relays, PC*i* and PC*j*. Actually, relays PC*i* and PC*j* are not decoding relays, because they can control punch magnets P11 and P12 directly through their front contacts PC*i*3 and PC*j*3. They constitute a sort of auxiliary relays, because, in order to control one or the other of punch magnets P11 and P12, it suffices to energize one or the other of relays PC*i* and PC*j*, which are associated with them.

In the description that follows, a full explanation will be given of the role played by relays PC*i* and PC*j* upon the recording of information concerning, for example, the number of the final-selector frames engaged with marker M.

Each of the upper ends of the energizing windings of decoding relays PC*d* . . . PC*j* is multipled to a certain number of front contacts of the various column relays, PA*a*/*t*, PB*a*/*t*, in order to allow the energization of decoding relays PC*d* . . . PC*j* at the proper time.

To make these explanations clear, the method will be discussed, for example, of recording the number of the register E that had shown up as faulty on the banks of member finder C. It will be recalled that the number of this register is 00. In the course of the preceding description it has been pointed out that this number was recorded in columns 8 and 9 of the recording form, column 8 being used for the tens digit and column 9 for the units digit. On the basis of the foregoing assumptions, the recording form will have two perforations on line 0, one in column 8 and the other in column 9. Of course, no attention is paid here to all the other perforations that must be made in order to record the hour, the number of the receiver, the number of the marker, etc.

The sending of digit 0 in coded form requires, as is known, the use of code elements 2 and 4, as examination of a table mentioned before in this connection will show. The sending of the register's number is done by using the whole set of code wires C*a*1 . . . C*a*5, C*b*1 . . . C*b*5. It follows from the foregoing comments that wires C*a*2, C*a*4, C*b*2, C*b*4 are grounded after the recording in coded form of the register's number. These wires terminate through cable C and front contacts CC*a*5 . . . CC*j*9 at "memory" relays MK*m*2, MK*m*4, MK*m*7, MK*m*9, corresponding to the above code wires. It will be recalled that the table of Fig. 9 allows seeing the association of "memory" relays MK*m*1/104 with the corresponding control wires. The punching of digit 0 requires the energization of decoding magnets PC*e* and PC*g*. To punch digit 0 in column 8 and 9 it is thus necessary to connect decoding relays PC*e* and PC*g* to "memory" relays MK*m*2 and MK*m*4, to punch column 8, and then to "memory" relays MK*m*7 and MK*m*9, to punch column 9. This connection of the decoding relays to the corresponding "memory" relays is made through the action of the contacts of the column relays associated with columns 8 and 9, namely, relays PA*h* and PA*i*. As is known, one control wire of the perforator is associated with each "memory" relay. These wires are referenced r1/104. Since "memory" relays MK*m*2, MK*m*4, MK*m*7, MK*m*9 are energized to record the number (00) of the calling register, perforator control wires *r*2, *r*4, *r*7, *r*9 are grounded over the following circuits:

(1) Wire *r*2—front contacts MK*c*2, MK*m*2/1, MK*a*3/4, ground.

(2) Wire *r*4—front contacts MK*c*4, MK*m*4/1, MK*a*3/4, ground.

(3) Wire *r*7—front contacts MK*c*7, MK*m*7/1, MK*a*3/4, ground.

(4) Wire *r*9—front contacts MK*c*9, MK*m*9/1, MK*a*3/4, ground.

The front contacts of column relays PA*h* and PA*i* are used to connect wires *r*2, *r*4, *r*7, *r*9 to decoding relays PC*e* and PC*g*. The pulling up of relay PA*h*, for example, connects wires *r*2, *r*4 to decoding relays PC*e* and PC*g*, while the pulling up of relay PA*i* connects wires *r*7, *r*9 to the same decoding relays, since the register's number is made up of two identical digits (00).

Each column relay controls 8 front contacts, 7 of them being used to connect, if need be, the energizing windings of the decoding relays to the corresponding "memory" relays, the eighth serving to control relay PC1, which is used to skip unused columns. These front contacts are shown in Fig. 8 as follows. Above the energizing winding of each of the decoding relays, PC*d* . . . PC*j*, is shown a single front contact actually representing the 40 front contacts belonging to the 40 column relays, PA*a/t* and PB*a/t*. However, it is well to point out that the 40 column relays mentioned above are not necessarily wired, for the reason that, depending upon operating requirements, a predetermined punch magnet need not be used for all the columns of the recording form. In other words, the digit 2, for example, the method of recording which has been discussed before, may be used in a certain number of columns, while different digits may be punched in other columns. A multipling arrow is used to characterize the 40 front contacts that can operate a specific decoding relay. These contacts are referenced in simplified fashion. Thus, shown for the first decoding relay (PC*d*) is the reference of the first contact associated with column relay 1 and the reference of the 1st contact associated with column relay 40, etc.

The table of Fig. 10 allows determining the wiring used for each column relay. This table is in two parts. It comprises 40 columns and 9 lines. The columns are numbered 1 to 40 and they correspond to the columns 1 to 40 of the recording form. To explain, it should be pointed out that owing to the multipling of the perforator's terminals, columns 1 to 40 and 41 to 80 are associated by twos, viz: 1 with 41, 2 with 42 . . . 40 with 80. The first 7 lines belong to the 7 decoding relays of the perforator, that is, to relays PC*d* . . . PC*j*. The role of the 8th and 9th lines will be explained later. The association of the 40 columns and the first 7 lines allows making up 280 boxes, corresponding to the 40×7=280 front contacts of the 40 column relays PA*a/t* and PB*a/t*. The 80 boxes formed by the intersection of the 40 columns and lines 8 and 9 correspond to the 40×2=80 front contacts of the 40 column relays mentioned above and whose role will be explained later. As pointed out before, the first 7 front contacts of a column relay are not necessarily wired. The purpose of this table is (1) to allow determining the identity of the contacts that have been wired and (2) to show the relationship existing between the wired contacts and the corresponding "memory" relays. When a front contact belonging to any of the column relays PA*a/t*, PB*a/t* is not wired, its box contains no information. On the other hand, when one of said front contacts is connected to any of the 104 "memory" relays MK*m*1/104, its box contains the reference of the associated "memory" relay.

To explain, the method of wiring the contacts of the column relays corresponding to columns 8 and 9 of the recording form will be described with reference to the table. In the course of the foregoing description it was pointed out that the column relays are referenced PA*h* and PA*i*. As is known, columns 8 and 9 are used to record the number of the registers of the exchange involved when the latter take the calling position on the banks of the member finder. There being 52 registers all told, the use of lines 11 and 12 of the recording form becomes superfluous, because columns 8 and 9 together allow recording 100 different numbers comprised between 00 and 99. Reference to a previously-mentioned table will show that the "memory" relays used to record the register's number in coded form are referenced MK*m*1 . . . MK*m*5, for the recording of the tens digit, and MK*m*6 . . . MK*m*10 for the recording of the units digit. Reference to the table of Fig. 10 will show that the first five boxes of column 8 contain the information MK*m*1 . . . MK*m*5 and the first five boxes of column 9 the information MK*m*6 . . . MK*m*10. This information means that upon energizing column relay PA*h* (belonging to column 8), the closing of the first five front contacts of said relay, namely, front contacts PA*h*1 . . . PA*h*5 (not shown in Fig. 8) connects the five "memory" relays MK*m*1 . . . MK*m*5 to the perforator's decoding relays PC*d* . . . PC*h*. Similarly, the closing of the first 5 front contacts of relay PH*i* (belonging to column 9) connects the five "memory" relays MK*m*6 . . . MK*m*10 to the 5 decoding relays PC*d* . . . PC*h*.

When in advancing in the perforator the recording from successively occupies the positions corresponding to columns 8 and 9, relays PA*h* and PA*i* will be energized in succession, thus connecting first the "memory" relays of column 8, and then the "memory" relays of column 9, to the first five decoding relays of the perforator. It will be recalled that the method has already been described of recording the number (00) of the register brought into calling position on the banks of member finder C.

The description will now be resumed of the operation of the perforator as from the moment relay PC*m* pulls up.

When the recording form reaches a position where column 1 can be punched, contact LC*p* closes and completes the energizing circuit of relay PD*r*, which pulls up: battery, right-hand winding of relay PD*r*, contacts LC*p* and C*eh* in "closed" position, ground.

Through the opening of its front contact PD*r*1, relay PD*r* breaks the perforator's availability circuit. Relay PD*r* completes a holding circuit for itself through the closing of its front contact PD*r*2: battery, front PD*r*2, left-hand winding of relay PD*r*, front PD*p*1, ground.

Upon the energization of the punch magnets used for punching the first column of the recording form, punching-control contact EC closes and completes the energizing circuit of perforating magnet P: battery, magnet P, contact EC in "closed" position, ground.

Perforating magnet P controls the operation of the punches whose clutches had been placed in operating position by the operation of the corresponding punch magnets.

At the same time that it controls the operation of the punches, perforating magnet P prepares the stepping of a column of the recording form and opens contact C*eh*, the effect of this being to break the energizing circuit of relay PC*m*, which releases, thereby breaking, through the opening of its front contact PC*m*2, the energizing circuit of column relay PA*a*, which releases in turn.

The release of column relay PA*a* causes, through the opening of its contacts PA*a*1 . . . PA*a*7, the release of the decoding magnets that had been seized for the punching of the first column. The release of the punch magnets follows from that of the decoding magnets and causes the opening of contact EC, this breaking the energizing circuit of perforating magnet P. This magnet releases the punches that had been seized and causes the recording form to advance into position for the perforation of column 2. When the recording form has reached position 2, contact C*eh* closes again and punching-control relay PC*m* re-energizes after checking through contacts PC*d*7, PC*e*7, PC*f*7, PC*g*7, PC*h*7, PC*i*7, PC*j*4 that the decoding magnets that were used to perforate column 1 have actually returned to normal. The pulling up of relay PC*m* again completes, through the closing of front contact PC*m*2, the grounding of position brush P*k*, the effect of this being to cause the energization of column-2 relay PA*b*, because brush P*k* has just passed into position 2, that is, in front of position terminal P*p*2.

The selfsame operation just described is repeated for the perforation of the various other columns of the recording form.

When the recording form reaches the last column, contact CD*c* closes and causes the release of differential relay PD*pq* through the energization of its upper winding: battery, contact CD*c* in "closed" position, upper winding of relay PD*pq*, ground.

The release of relay PD*pq* causes the energization of relay MK*d* through the placing of front-back contact PD*p*2 in "back" position: battery, relay MK*d*, front MK*c*108, back PD*p*2, ground.

Relay MK*d* releases the "memory" relays engaged with perforator P. It completes a holding circuit for itself through the closing of its front contact MK*d*1: battery, relay MK*d*, front contacts MK*d*1 and MD*e*2, ground.

The placing of front-back contact MK*d*2 in "front" position opens the energizing circuit of relay MK*a* and short-circuits the energizing circuit of relay MK*b*, which releases with a certain delay.

Through the opening of its front contacts MK*a*3/4, relay MK*a* opens the holding circuit of the "memory" relays, which release in turn.

Relay MK*b* releases with a certain delay and breaks the holding circuit of relay KC*t* through the opening of its front contact MK*b*2.

The release of relay MK*c* breaks the connection of the "memory" relays to perforator P through the opening of contacts MK*c*1/104. The opening of front contact MK*c*107 releases the first memory's busying relay (MK*e*).

This relay in turn breaks the energizing circuit of release relay MK*d* through the opening of its front contact MK*e*2.

Upon the release of relay PD*no*, back contact PD*n*1 closes and completes the energizing circuit of PD1*m*, which pulls up: battery, relay PD1*m*, back contacts PD*n*1 and PD*p*1, ground.

The energization of relay PD1*m* causes the energization of an electromagnetic clutch (E), the effect being to cause the perforator's carriage to return to normal: battery, clutch E, front PD12, back PD*p*4, contact CC in back position, ground.

A motor (not shown) then returns the perforator's carriage to normal position. Once this is done, contact CC opens and breaks the energizing circuit of the clutch, which thus disengages the electric motor restoring the perforator's carriage to normal position.

It may be that the recording form contains columns calling for no perforation. In that case, none of the coding relays PC*d* . . . PC*j* pulls up when the corresponding column relay energizes. The chain of back contacts PC*d*1 . . . PC*j*1 remains closed as a result. The ninth contact of each column relay is designed to make the form skip whenever the column corresponding to the above-mentioned relay is not to contain any perforation. Reference to the table of Fig. 10 will show that the boxes corresponding to the ninth contact of some column relays contain a characteristic sign, in this instance a "ground." The presence of this "ground" means that the corresponding front contact has one of its poles grounded in Fig. 8. The 40 corresponding front contacts of the 40 column relays TA*a*/*t*, TB*a*/*t* have their lower poles multipled together and connected to the chain of back contacts PC*d*1 . . . PC*j*1. Thus, upon the energization of the various column relays PA*a*/*t*, PB*a*/*t*, the above contact chain can be grounded whenever the recording form occupies certain positions.

In other words, the recording form contains columns that must be perforated regardless of the recording effected (case of the recording of the hour, for example) and columns that may or may not be perforated depending upon the particular recording involved. Thus, for example, if the faulty member is a tester, there will be no information in columns 8 and 9, used to record the number of the registers. The column relays corresponding to columns that must necessarily be perforated accordingly have their ninth contact isolated, while the column relays corresponding to columns that may be perforated at option have their ninth contact grounded. Reference to the above-mentioned table will show that the column relays of columns 1 to 7, inclusive, have their ninth contact isolated (the corresponding boxes contain no information), while the relays of columns 8, 9, 10, etc., have their ninth contact grounded, because boxes 1 to 7 must contain perforations regardless of the particular recording involved, while the next columns may or may not be perforated, depending upon what is to be recorded.

From the foregoing explanations it follows that whenever the recording form occupies a position where no perforation is to be made, the chain of back contacts PC*d*1 . . . PC*j*1 is grounded, the effect of this being to energize skipping relay PC1. Through the placing of its front-back contact PC11 in "front" position, skipping relay PC1 causes the energization of skipping magnet G: battery, skipping magnet G, front contact PC11, ground over a circuit already described.

Skipping magnet G performs a function identical with that of punch magnets P0 . . . P12. However, it is not associated with any punch, its purpose being to cause a dummy operation of perforating magnet P by causing the closing of the above-mentioned contact EC. In other words, when a column of the recording form is to be skipped, perforating magnet P is energized normally, thus causing the form to advance by one step without however making any perforation, this being achieved thanks to the use of skipping magnet G.

The method of wiring the column magnets of columns 1 to 7, inclusive, will now be described with reference to the table of Fig. 10. As pointed out before, column 1 is used to show the nature of the recording appearing on the recording form. To characterize the recording of a fault occurring in a common or in an individual member of the exchange involved, a perforation is made on line 0 in column 1. It is known that the perforation "0" requires the use of elements 2 and 4 of the five-element code used for sending information from the member finder to the perforator. This perforation therefore calls for the energization of the decoding magnets PC*e* and PC*g* corresponding precisely to elements 2 and 4 of said code. The boxes of column 1 corresponding to lines 2 and 4 contain the information MK*c*105 and MK*c*106, meaning that the 2nd and 4th front contacts of column magnet PA*a* are connected through cable R to front contacts MK*c*105 and MK*c*106 of relay MK*c* (it will be recalled that relay MK*c* actually consists of a certain number of individual relays operating simultaneously). Thus, when the recording form is in position 1 and the corresponding column relay PA*a* has energized, decoding magnets PC*e* and PC*g* have their energizing circuit completed and they pull up in turn.

Columns 2 to 7, inclusive, are intended to record the instant the fault occurs. It will be recalled in this connection that columns 2 and 3 record the day of the month (tens and units), columns 4, 5, 6 and 7 the hour, the minutes (tens and units) and, finally, tenths of a minute. The information required for this recording is furnished by a clock represented by a rectangle referenced H in Fig. 8. The operation of this clock, which can be mechanical, electrical or of any other type, will not be described. This clock sends the various above-mentioned codes by means of 32 wires referenced *h*1/32 in Fig. 8. The first ten of these wires, *h*1/10, are used to send the day-of-the-month code, the first five being used for the tens and the next five for the units. These wires appear in the boxes of lines 1 to 5 in columns 2 and 3. The next seven wires, namely, wires *hi*1 . . . *hi*7, are for sending the hour. Seven wires are used because the figure representing the hour can be comprised between 00 and 23, this requiring the use of perforations on additional lines 11 and 12 of the recording form. It will be recalled that whenever the hour is comprised between 10 and 19, an additional perforation is made on line 11, line 12 being reserved for hours comprised between 20 and 23. Wires *h*11 . . . *h*17 appear in the boxes of column 4. The last three 5-wire groups, that is, groups *h*18/22 . . . *h*23/27, *h*28/32, are for the coded sending of the minutes (tens and units) and of tenths of a minute. These wires are shown in the boxes of columns 5, 6 and 7.

A description will now be given, with reference to the table of Fig. 10, of the method of recording the characteristic potential of the fault wires associated either with the common or with the individual members of the exchange involved. This table shows the method of connecting these fault wires to the corresponding "memory" relays. The corresponding "memory" relays are found again in this table, their identification number being shown in some of the boxes comprised between columns 18 to 39, inclusive. It will be seen, for example, that the 21 boxes of the seventh line of this table (that is, the boxes comprised between columns 19 and 39) belong to the 21 fault wires of the register. As is known, the 7th line of this table is associated with the perforator's decoding relay (PC*j*). It will be recalled in this connection that the energization of decoding relay PC*j* entails the energization of punch magnet P12, which, as is known, following the energization of perforating magnet P (Fig. 8), provides for recording the information on line 12 of the recording form. Likewise, the boxes of the 6th line of the Fig. 10 table that are comprised between columns 18 and 25, inclusive, belong to the fault wires of the receiver. This 6th line belongs in the perforator to decoding relay PC*i*, which controls the punch magnet (P11) subsequently recording on the 11th line of the recording form.

As regards the method of recording the fault wires of the markers, testers and translators, use is made of additional "memory" relays MK*m*101, MK*m*102 and MK*m*103, whose operation will now be described. As regards the markers, for example, it will be noticed that the "memory" relays intended to record their fault wires appear on the second line of the Fig. 10 table, between columns 21 to 31, inclusive. To this second line belongs in the perforator the decoding relay PC*e*. It was pointed out before that the first five decoding relays, PC*d* . . . PC*h*, are used to decode the information sent them in a 5-element code using two elements to send one piece of information. In other words, in order to control from decoding relays PC*d* . . . PC*h* any punch magnet chosen from among the ten punch magnets P0 . . . P9, it is necessary to energize simultaneously two decoding relays suitably chosen from among the five relays PC*d* . . . PC*h*. Since the second line of the Fig. 10 table belongs to only one decoding relay (relay PC*e*), in order to obtain the operation of any one of the punch magnets P0 . . . P9 it is necessary to energize, through some suitable means, a second decoding magnet suitably chosen from the group PC*d* . . . PC*h* or, what amounts to the same, to short-circuit the decoding contacts of said relay by means of an auxiliary relay, so as to complete the energizing circuit of a punch magnet already partly prepared owing to the energization of decoding relay PC*e* and the closing of its corresponding front contact.

It has been seen before that lines 11 and 12 of the recording form are reserved (between columns 18 and 19) to record the fault wires associated with the registers and with the receivers. Since at the instant a fault occurs a register can be associated both with a receiver and with a marker, it is necessary to provide for the recording of the marker's fault wires on one of the ten lines 0 . . . 9 still available on the recording form between columns 18 and 39. It will be assumed in what follows that this recording is done on line 2 of the recording form.

Reference to a previously-mentioned table will show that the sending of the digit 2 in coded form requires the use of code elements 2 and 5. It will be recalled that these code elements 2 and 5 correspond in the perforator to decoding relays PC*e* and PC*h*. When as it advances in the perforator the recording form brings about, through brush P*k*, the energization of the column relays belonging to columns 21, 22 . . . 31, decoding relay PC*e* will pull up each time a fault must be recorded in a predetermined column. In order to make the operation of a punch effective, it is therefore necessary to energize "artificially" the decoding relay corresponding to the missing code element, that is, relay PC*h*. An auxiliary relay, referenced PC*o* in Fig. 8 and whose front contact PC*o*1 energizes relay PC*h*, has been provided to effect this energization.

Relay PC*o* can be connected by means of the first front contact of the column-17 relay (relay PA*q*) to the auxiliary "memory" relay bearing the number MK*m*101. The number of this relay appears on the first line of the Fig. 10 table, in column 17. It should be pointed out in this connection that relay PA*q* (of column 17) does not have the lower poles of its front contacts PA*q*1 . . . PA*q*9 connected to decoding relays PC*d* . . . PC*j*. This relay has a special wiring method, because the lower poles of its above-mentioned front contacts are connected to auxiliary relays PC*o* . . . PC*q* by means of cable R (Fig. 8).

In fact, reference to Fig. 8 will show that the energizing winding of relay PC*o* is completed whenever the column-17 relay (PA*q*) pulls up: battery, relay PC*o*, front PA*q*1, wire *r*101 through cable R, front MK*c*101, MK*m*101/1, MK*a*3/4, ground.

The energization of relay PC*o* is therefore made dependent upon the energization of "memory" relay MK*m*101. It was pointed out before that in the course of connecting the marker, the closing of front contact CV*i*5 (Fig. 6) had the effect of grounding wire *t*. Wire *t* is connected by means of cable C, across Figs. 6, 5, 8, and of one of the front contacts CC*a*5 . . . CC*j*9 to the energizing winding of "memory" relay MK*m*101. Stated otherwise, relay MK*m*101 pulls up as soon as the connection of the faulty marker becomes effective, because front contact CV*i*5 is associated with connecting magnet CV*i*.

It follows from the foregoing explanations that whenever the recording form reaches the positions corresponding to columns 21, 22, etc., as it advances in the perforator, the recording of the fault wires associated with the seized marker will be effected on line 2 of the form.

The recording of the fault wires of the translators and testers of the exchange involved also requires the use of a method similar to the one just described, since line 0 of the recording form is reserved for the translators and line 1 for the testers. For this recording, use is made in the perforator of two auxiliary relays, PC*p* and PC*q*, associated with two auxiliary "memory" relays, MK*m*102 and MK*m*103, the position of whose corresponding boxes will be found in the Fig. 10 table.

In the description of the recording of a fault occurring in a register it has been assumed that the latter was associated with a receiver and with a marker. It may happen that the connection of the receiver to the marker is not yet effective at the instant the fault occurs. In that case, the markers' ringing relay (CC*e*—Fig. 6) cannot pull up after the closing of front contact CC*f*2 and of back contact CA*d*4. Thus, general holding relay CA*ab*, whose winding was short-circuited upon the connection of the receiver owing to the closing of front contacts CV*h*5, will release after a certain lag, since back contact CC*e*1 will remain in "closed" position. From this it follows that the release of general holding relay CA*ab* will entail the release of the member finder and cause, in accordance with a method similar to the one already described, the seizure of perforator P, which then records the same way as previously described.

Also, if the register is not busy with any individual member at the instant a fault occurs, general holding relay CA*ab*, whose energizing winding has just been short-circuited by the closing of front contact CA*f*4, will release after a certain lag, causing the release of the member finder and the seizure of the perforator.

It will now be assumed that, at the instant a fault occurs, register E is connected to a translator D through translator connector CT. It will be recalled that when the connection of the register has become effective, relay CA*f* pulls up and wire *c* is grounded, the effect of this being to cause the energization of relay DA*k*, comprised in the translator. This relay DA*k* performs a function similar to that of relay RH*m* in receiver R. It characterizes the fact that the register with which the tanslator is engaged has been brought into calling position on the banks of member finder C and that the connection of the member finder has just become effective. Through the closing of its front contact DA*k*1, relay DA*k* brings translator D into calling position on the banks of the member finder. The method of connecting translator D, which is wholly identical with the method of connecting receiver R, will not be described again. It will be noticed that the front contacts DA*k*1 and RH*m*1 associated with the ringing relays of translator D and of receiver R are connected in parallel; thus, the closing of one or the other of these contacts causes in member finder C the pulling up of ringing relay CC*d*, which therefore, as can be seen, is common both to the receivers and to the translators of the exchange involved. It should be pointed out in this connection that it is in fact possible to use a common ringing relay for the translators and the receivers, because in the exchange referred to in the general description of the operation of the system the register can at no time be connected at once to a translator and to a receiver. Reference to the patent-addition applications mentioned at the beginning of this description will indeed show that, in putting through an outgoing call, the register releases the translator once it has received from the latter the information required for controlling the group selection and thereupon takes the calling position on the banks of receiver connector CR. It follows from these explanations that the same selectors can be used to connect (1) the line and group receivers and (2) the translators. It will be recalled in this connection that the total number of receivers is 20, this number being divided into 10 line receivers and 10 group receivers. Thus, 20 azimuths are occupied on the banks of the selectors associated with the receivers, that is, selectors C*a*6 . . . C*h*6, C*h*7 . . . C*h*7, controlled by connecting magnets CV*g* and CV*h*.

It will be assumed that the exchange involved has two translators, which will be termed translator 1 and translator 2. It is known that the selectors used to make up a member finder have 26 different azimuths.

Since 20 out of them are used for the 10 line receivers and the 10 group receivers, there are still 6 azimuths left free. It will be assumed that translators 1 and 2 are associated with azimuths 25 and 26. Azimuths 21 . . . 24 thus remain free and can be used to connect additional receivers or translators.

It has been pointed out before that the identification number of the receivers consists of two digits, the units digit, comprised between 0 and 2, serving to identify the category of the receiver and the tens digit indicating the serial number of the receiver in its category. The determination of the identity of a translator requires knowing only one digit. Since the digits 0, 1, 2 and 3 are used to determine the category of the receivers, six digits, comprised between 4 and 9, are still available for the corresponding column (column 10) of the recording form. Two out of these are used to identify the translators. It will be assumed in what follows that the digits used are digit 4 for translator number 1 and digit 5 for translator number 2.

These digits are recorded in the same column as the digits used to determine the category of the receiver, that is, in column 10 of the recording form. Since the register cannot be connected simultaneously to a receiver and a translator at any time during the selection, the same "memory" relays can be used to record the fault wires of the receivers and the translators. Reference to the Fig. 10 table will show that the "memory" relays used for recording the fault wires of a predetermined member are on one and the same line, further corresponding to the serial number of the corresponding line of the recording form. Thus, without some special trick, the fault wires of the receivers and the translators are recorded on one and the same line, namely, line 11. To overcome this drawback, provision is made to record the fault wires of the translators on line 0 of the recording form. To make this line shift, there is available in the perforator an auxiliary relay referenced PC*p* in Fig. 8 and whose function is to direct the energizing ground of punch magnet 41 to punch magnet P0. In other words, when as it advances in the perforator the recording form reaches positions 18 and following, the corresponding column relays connect, for each column, the energizing winding of decoding relay PC*i* to the corresponding "memory" relay. If, for some predetermined column, decoding relay PC*i* must pull up owing to the energization of the corresponding "memory" relay, it completes the circuit of punch magnet P11 through the closing of its front contact PC*i*3. On the other hand, when auxiliary relay PC*p* is pulled up, its contact PC*p*1 switches in the energizing winding of punch magnet P0, owing to the placing of front-back contact PC*p*1 in "front" position. From the preceding explanations it follows that, in order to record the fault wires of a translator on line 0 of the recording form, it suffices to energize relay PC*p*. Relay PC*p* is energized upon the connection of the calling translator as described below.

Since the identification number of the translators comprises only one digit, while that of the receivers comprises two, wipers C*a*6 of the first selector, corresponding to azimuths 25 and 26, with which are associated translators 1 and 2, are left free. This allows using these wipers to energize an auxiliary "memory" relay, referenced MK*m*102 in Fig. 8, upon the connection of a translator. The energizing circuit of this relay is not shown in Fig. 5. This auxiliary "memory" relay **MK*m*102** appears on line 2, column 17, of the Fig. 10 table. This "memory" relay MK*m*102, the same way as relay MK*m*101, energizes column-shifting relay PC*p* over the following circuit: battery, relay PC*p*, contact PA*q*2 of the column-17 relay (relay PA*q*), wire *r*102 through cable R, front contacts MK*c*102, MK*m*102/1, MK*a*3/4, ground.

In this manner, whenever a translator is brought into calling position, its fault wires are recorded on line 0 of the recording form owing to the consecutive energization of auxiliary "memory" relay MK*m*102 and of column-shifting relay PC*p*.

The operation of the member finder when a tester is brought into calling position will now be described briefly. It will be assumed that the exchange involved comprises 20 testers, divided into ten 2-tester groups, each corresponding to a line-selecting means serving 500 lines. In other words, with each line-selecting means are associated 2 testers, termed tester 1 and tester 2. The testers are grouped on the azimuths 1 to 20 of individual selector *Ca*10 . . . *Ch*10 the same way as the previously-mentioned line markers. To identify these testers there are 4 identification relays, CH*b*, CH*c*, CH*a*, CH*f*, the first two discriminating the testers in a 500-line group and the last two determining the identity of the 500-line group in a predetermined 1000-line group. It will be noticed that relays CH*a* and CH*f* are common both to the line markers and to the testers. This is due to the fact that whenever a tester is brought into calling position on the banks of the member finder, and at the instant a fault occurs it is associated with a line marker, said marker necessarily forms part of the same 500-line group as the calling tester, since each line-selecting means is associated with two markers and with 2 specific testers. The determination of the 1000's is effected by the set of relays CE*f* . . . CE*j*, which obviously are the same as those serving to determine the 1000's comprising the calling marker. The reason for this is the same as mentioned before in connection with relays CH*a* and CH*f*.

Whenever in hunting for a calling line a tester is brought into calling position on the banks of the member finder, an individual ringing relay, not shown but forming part of tester equipment T, closes its front contacts TF*y*1 and TF*y*2 (Fig. 7). The effect of this is to energize ringing relay CB*abc* over the following circuit: battery, relay CB*abc*, back CA*f*5, CB*f*9, front TF*y*1, ground.

Through the opening of its back contact CB*a*1, relay CB*abc* breaks the register's ringing circuit and through the closing of its front contact CB*a*2 prepares the energizing circuit of connecting magnet CV*k*, which brings about the operation of selector *Ca*10 . . . *Ch*10. The energizing circuit of general holding relay CA*ab* is completed by the closing of front contact CA*b*3: battery, resistance CR54, relay CA*ab*, front CA*b*3, ground.

As from this moment, the method of hunting for and connecting a calling tester is the same as described with reference to a calling register, already discussed. When the hunting for the tester has ended, connecting magnet CV*k* pulls up and connects the tester's fault wires to the corresponding "memory" relays. It further prepares, through the closing of its front contact CV*k*4, the energizing circuit of marker ringing relay CC*e*. If a line marker is then engaged with the corresponding tester, relay MM*u* of the corresponding marker pulls up, owing to the grounding of wire *j* by front contact CV*k*6 through selector *Cc*10. The hunting for and the connection of the marker are then effected the same way as previously described with reference to the line marker M associated with register E.

Since in hunting for the calling line only one line receiver and one line marker are used as common and individual members, the "memory" relays allotted to the receivers can be used to record the fault wires of the tester. This leads to an arrangement similar to the one described before with reference to the recording of the translator's fault wires. It should be mentioned in this connection that the translator's fault wires are recorded, not on line 11 but on line 0 of the recording form thanks to the use of a column-shifting relay associated with an auxiliary "memory" relay. Since the tester's fault wires are recorded on line 1 of the recording form, this leads to the use of a second column-shifting relay, referenced PC*q* in Fig. 8 and whose function consists in directing to punch magnet P11 the ground applied by front contact PC13.

Upon the pulling up of the connecting magnet CV*k* associated with the testers of the exchange, the closing of front contact CV*k*5 ground wire *t'*, with which is associated an auxiliary "memory" relay MK*m*103. Reference to the Fig. 10 table will show relay MK*m*103 on line 3 in column 17. When the recording form reaches position 17 as it advances in the perforator, column relay PA*q* pulls up and then completes the energizing circuit of column-shifting relay PC*q*, which pulls up in turn: battery, relay PC*q*, contact PA*q*3, wire *r*103 through cable R, front MK*c*103, MK*m*103/1, MK*a*3/4, ground.

Front-back contact PC*q*1 of relay PC*q* then directs the ground to punch magnet P1, the effect of this being to record the fault wires of the corresponding tester on line 1 of the recording form.

It is quite obvious that the foregoing descriptions have been given only as nonlimitative examples and that numerous modifications can be made without thereby departing from the scope of the invention.

Thus, for example, the crossbar switches used to hunt for and to connect common or individual members to the corresponding "memory" relays can be replaced either with rotary switches or with electronic devices using vacuum tubes.

The relay chains described can be replaced with chains of different design but performing the same functions.

Instead of recording the fault wires of the register, receiver, translator and tester in the same columns, although on different lines, it is quite obviously possible to associate a certain number of columns with each member for the recording of its fault wires.

The codes used for the sending of information among the various pieces of equipment can obviously be different from the codes used in the present invention.

The "memory" relays used for the temporary recording of the fault wires can be replaced with (1) magnetic memories, (2) electronic memories using discharge devices, or vacuum tubes, or (3) semi-conductors. Similarly, it is possible to replace the recording form with magnetic-memory devices consisting either of magnetic drums or of multi-track magnetic tapes.

What is claimed is:

1. A telephone system comprising a plurality of common members and a plurality of individual members adapted to be temporarily connected therewith, said members being adapted to control the various selections involved in routing a call, a device for signalling and recording information representing faults likely to affect a seized common member and the various members temporarily connected thereto comprising an auxiliary memory, a fault recorder, means for successively connecting the seized common member and the various individual members temporarily connected to said common member at the moment the fault occurs to said auxiliary memory, means in said auxiliary memory for thereupon sending to said fault recorder the information received, and means for thereupon releasing said auxiliary memory.

2. A telephone system, as claimed in claim 1 further comprising a time device associated with each common member and adapted to control the time taken to perform each elementary operation brought about by the said common member, a finder for said common members, means controlled by each of said timing devices whenever the common member associated therewith takes more than its allotted time to perform said elementary operations for signalling to said finder that that particular common member is in calling condition, and means for causing said finder to cause said auxiliary memory to be connected to said common member in response to said signal.

3. A telephone system, as claimed in claim 2, in which each of the members has a fault wire, means responsive to a fault for placing a potential on a fault wire characteristic of the condition of the circuit connected thereto at the moment the fault arises, the means for connecting the common members to the auxiliary memory comprising means to connect said fault wires to said auxiliary memory to record the characteristic potential appearing on a fault wire so connected.

4. A telephone system, as claimed in claim 2, further comprising means for indicating the identity of a particular common member by the position of the member finder when connected thereto, and means for transmitting the identity of said common member from said member finder to said auxiliary memory for recording thereon.

5. A telephone system, as claimed in claim 4, further comprising means responsive to a completed connection between a faulty common member and the auxiliary memory and the readiness of said memory to record the condition of the fault wires of said common member for causing the temporary release of the member finder and the sending of a special signal to the seized common member, means in said common member for receiving said special signal and for transmitting it to the various individual members with which it is temporarily associated at the instant the fault occurs, means for indicating to the member finder that the first of said individual members is in calling condition and for cancelling the temporary release of said member finder, whereby said auxiliary memory is connected to the fault wire of said first individual member by said member finder, and means for repeating this cycle for each individual member temporarily associated with such common member, whereby said auxiliary memory may record in succession the identity and the condition of the fault wires of said individual members.

6. A telephone system, as claimed in claim 5, further comprising means responsive to the receipt by the auxiliary memory of the identity and the condition of the fault wires of the last individual member seized by the common member for releasing the member finder after a predetermined period of time, means in response to the release of such member finder for connecting said auxiliary memory to the fault recorder and for transferring the information received by the said auxiliary memory to said fault recorder, means responsive to the recording of the information in the fault recorder for releasing the auxiliary memory, whereby information with respect to the time the fault occurred is recorded.

7. A telephone system, as claimed in claim 6, in which there are a plurality of auxiliary memories, whereby the member finder may be connected to a free auxiliary memory while another auxiliary memory is transferring its information to the fault recorder.

8. A telephone system, as claimed in claim 7, further comprising a time device associated with a common member controlling only a small number of elementary operations, said time device being adapted to operate after the time taken to perform all of said operations, and means to cause the operation of said time device to place said common member in calling condition with respect to the member finder, whereby it may be connected to the auxiliary memory.

References Cited in the file of this patent

UNITED STATES PATENTS

| | | |
|---|---|---|
| 2,202,921 | Powell | June 4, 1940 |
| 2,364,796 | Korn | Dec. 16, 1944 |
| 2,383,770 | Carson et al. | Aug. 28, 1945 |
| 2,392,090 | Joel | Jan. 1, 1946 |